United States Patent
Morita et al.

(10) Patent No.: US 10,979,751 B2
(45) Date of Patent: Apr. 13, 2021

(54) COMMUNICATION MANAGEMENT APPARATUS, METHOD AND COMPUTER-READABLE STORAGE MEDIUM FOR GENERATING IMAGE DATA IDENTIFICATION INFORMATION COMMUNICATION

(71) Applicants: Kenichiro Morita, Tokyo (JP); Kumiko Yoshida, Tokyo (JP); Yoichiro Matsuno, Kanagawa (JP); Takuya Imai, Tokyo (JP); Shoh Nagamine, Kanagawa (JP); Junpei Mikami, Kanagawa (JP)

(72) Inventors: Kenichiro Morita, Tokyo (JP); Kumiko Yoshida, Tokyo (JP); Yoichiro Matsuno, Kanagawa (JP); Takuya Imai, Tokyo (JP); Shoh Nagamine, Kanagawa (JP); Junpei Mikami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/284,868

(22) Filed: Feb. 25, 2019

(65) Prior Publication Data
US 2019/0191198 A1  Jun. 20, 2019

Related U.S. Application Data

(63) Continuation of application No. 15/707,553, filed on Sep. 18, 2017, now Pat. No. 10,264,302.

(30) Foreign Application Priority Data

Sep. 30, 2016 (JP) ................. 2016-193188
Jun. 20, 2017 (JP) ................. 2017-120609
Sep. 13, 2017 (JP) ................. 2017-175340

(51) Int. Cl.
G06F 3/12 (2006.01)
H04N 21/258 (2011.01)
(Continued)

(52) U.S. Cl.
CPC ... H04N 21/25841 (2013.01); H04N 1/00103 (2013.01); H04N 1/00244 (2013.01);
(Continued)

(58) Field of Classification Search
None
See application file for complete search history.

(56) References Cited

U.S. PATENT DOCUMENTS 8,570,329 B1 * 10/2013 Ofstad ................... G06T 13/20
345/473
8,836,750 B2 * 9/2014 Liu ........................ H04N 7/144
348/14.01
(Continued)

FOREIGN PATENT DOCUMENTS

JP  2004-007283  1/2004
JP  2004-254031  9/2004
(Continued)

OTHER PUBLICATIONS

Extended European Search Report dated Mar. 2, 2018 in Patent Application No. 17193007.6.
(Continued)

*Primary Examiner* — Dung D Tran
(74) *Attorney, Agent, or Firm* — Oblon, McClelland, Maier & Neustadt, L.L.P.

(57) ABSTRACT

A communication management apparatus includes a receiver to receive image type information indicating a type of an image from a first communication terminal; circuitry to generate image data identification information for identifying image data to be transmitted from the first commu-
(Continued)

nication terminal to a second communication terminal, based on reception of the image type information; and a transmitter to transmit the image data identification information that is generated to the first communication terminal, and transmit the image data identification information that is generated and the image type information that is received to the second communication terminal.

6 Claims, 22 Drawing Sheets

(51) Int. Cl.
| | |
|---|---|
| H04N 5/232 | (2006.01) |
| H04N 7/14 | (2006.01) |
| H04N 7/15 | (2006.01) |
| H04N 1/00 | (2006.01) |
| H04N 5/225 | (2006.01) |
| H04N 21/2743 | (2011.01) |
| H04N 21/45 | (2011.01) |

(52) U.S. Cl.
CPC ....... *H04N 5/2258* (2013.01); *H04N 5/23206* (2013.01); *H04N 5/23238* (2013.01); *H04N 5/232061* (2018.08); *H04N 7/142* (2013.01); *H04N 7/147* (2013.01); *H04N 7/15* (2013.01); *H04N 21/2743* (2013.01); *H04N 21/4524* (2013.01); *H04N 2007/145* (2013.01)

(56) References Cited

U.S. PATENT DOCUMENTS

| | | | | |
|---|---|---|---|---|
| 9,582,731 | B1* | 2/2017 | Butko | G06K 9/00664 |
| 9,756,242 | B2* | 9/2017 | Harada | G06F 3/04817 |
| 9,911,454 | B2* | 3/2018 | van Hoff | G11B 19/20 |
| 10,764,513 | B2* | 9/2020 | Ohmura | H04N 5/272 |
| 10,778,865 | B2* | 9/2020 | Morita | H04N 5/232 |
| 2003/0123696 | A1* | 7/2003 | Matsumoto | H04N 1/00867 382/100 |
| 2007/0058879 | A1* | 3/2007 | Cutler | G06T 5/006 382/254 |
| 2008/0306964 | A1‡ | 12/2008 | Molnar | G06F 19/321 |
| 2013/0326419 | A1* | 12/2013 | Harada | G06F 3/04817 715/838 |
| 2014/0297829 | A1* | 10/2014 | Miyazawa | H04L 12/1831 709/223 |
| 2014/0340465 | A1* | 11/2014 | Shi | H04N 7/15 348/14.03 |
| 2015/0249696 | A1‡ | 9/2015 | Nagase | H04L 65/403 709/20 |
| 2015/0381902 | A1* | 12/2015 | Bao | H04N 7/147 348/14.07 |
| 2016/0165136 | A1‡ | 6/2016 | Mitsui | H04N 5/23238 348/36 |
| 2016/0196852 | A1 | 7/2016 | Sievert et al. | |

FOREIGN PATENT DOCUMENTS

| | | |
|---|---|---|
| JP | 2005-094713 | 4/2005 |
| JP | 2003-284019 | 10/2006 |
| JP | 2008-085930 | 4/2008 |
| JP | 2010-166235 | 7/2010 |
| JP | 2011-004007 | 1/2011 |
| JP | 2011-223076 | 11/2011 |
| JP | 2012-178135 | 9/2012 |
| JP | 2015-173424 | 10/2015 |
| JP | 2016-110639 | 6/2016 |

OTHER PUBLICATIONS

Office Action dated Jul. 24, 2020, in corresponding European Patent application No. 17193007.6.

\* cited by examiner
‡ imported from a related application

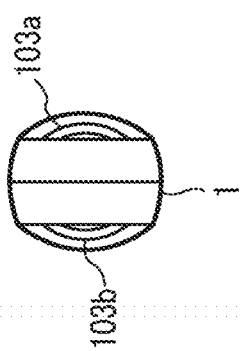
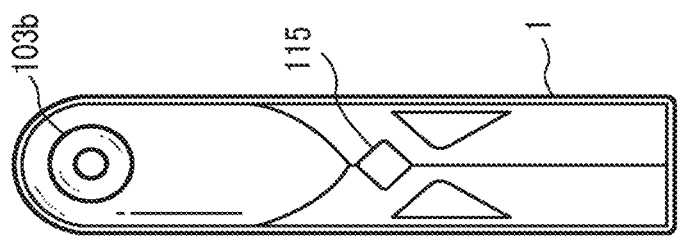
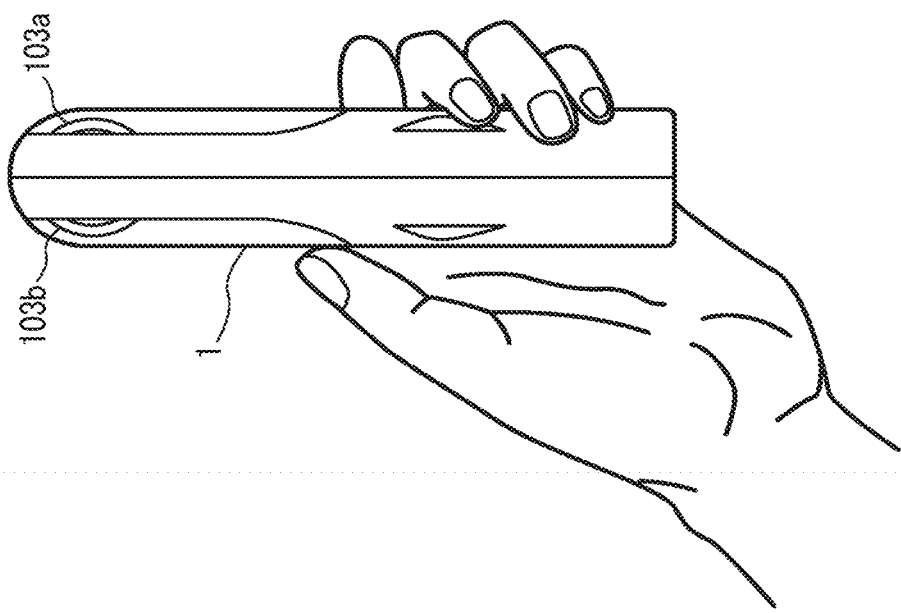

FIG. 3A
FIG. 3B
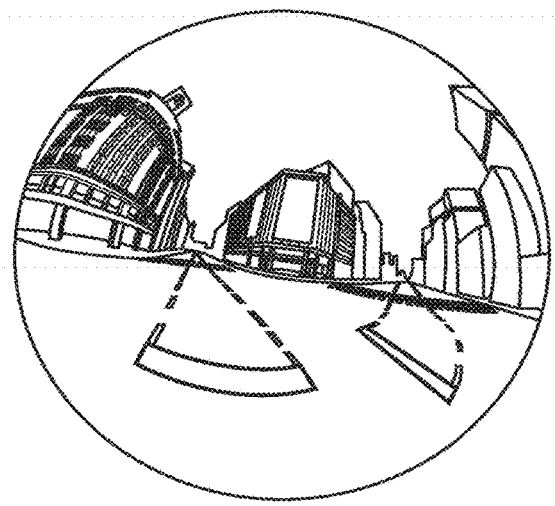
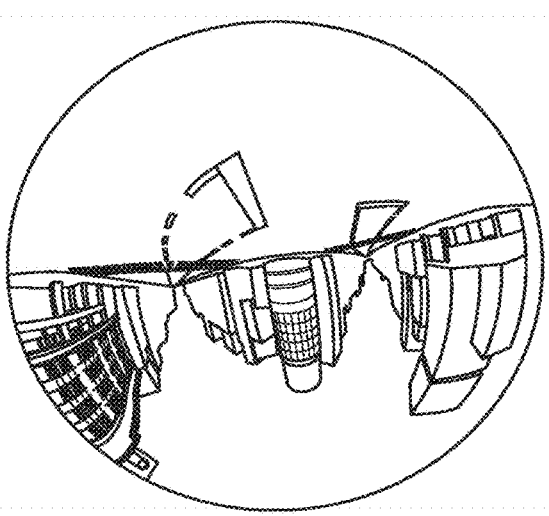
FIG. 3C
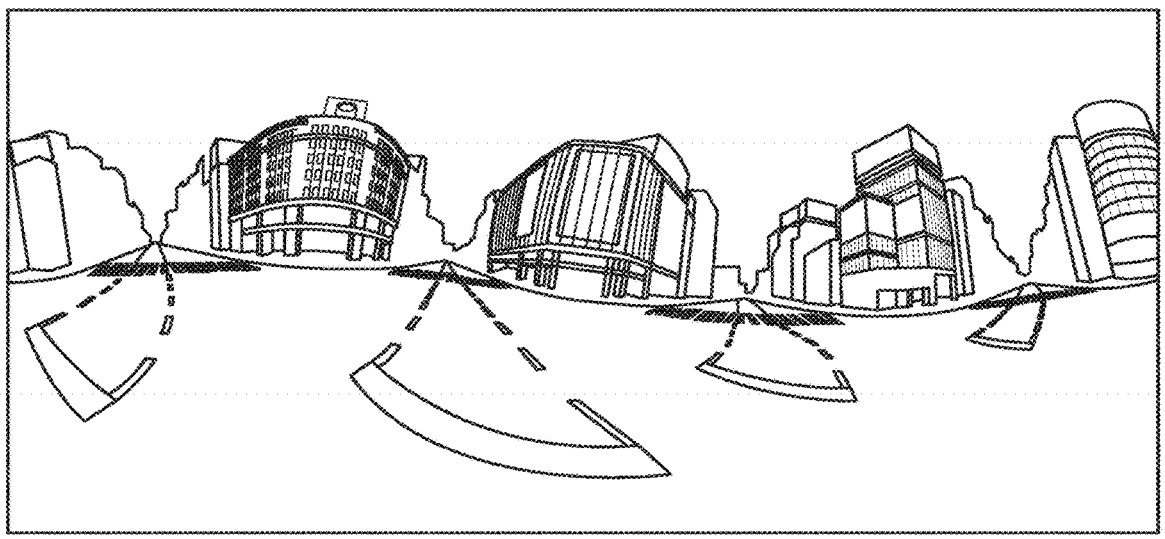

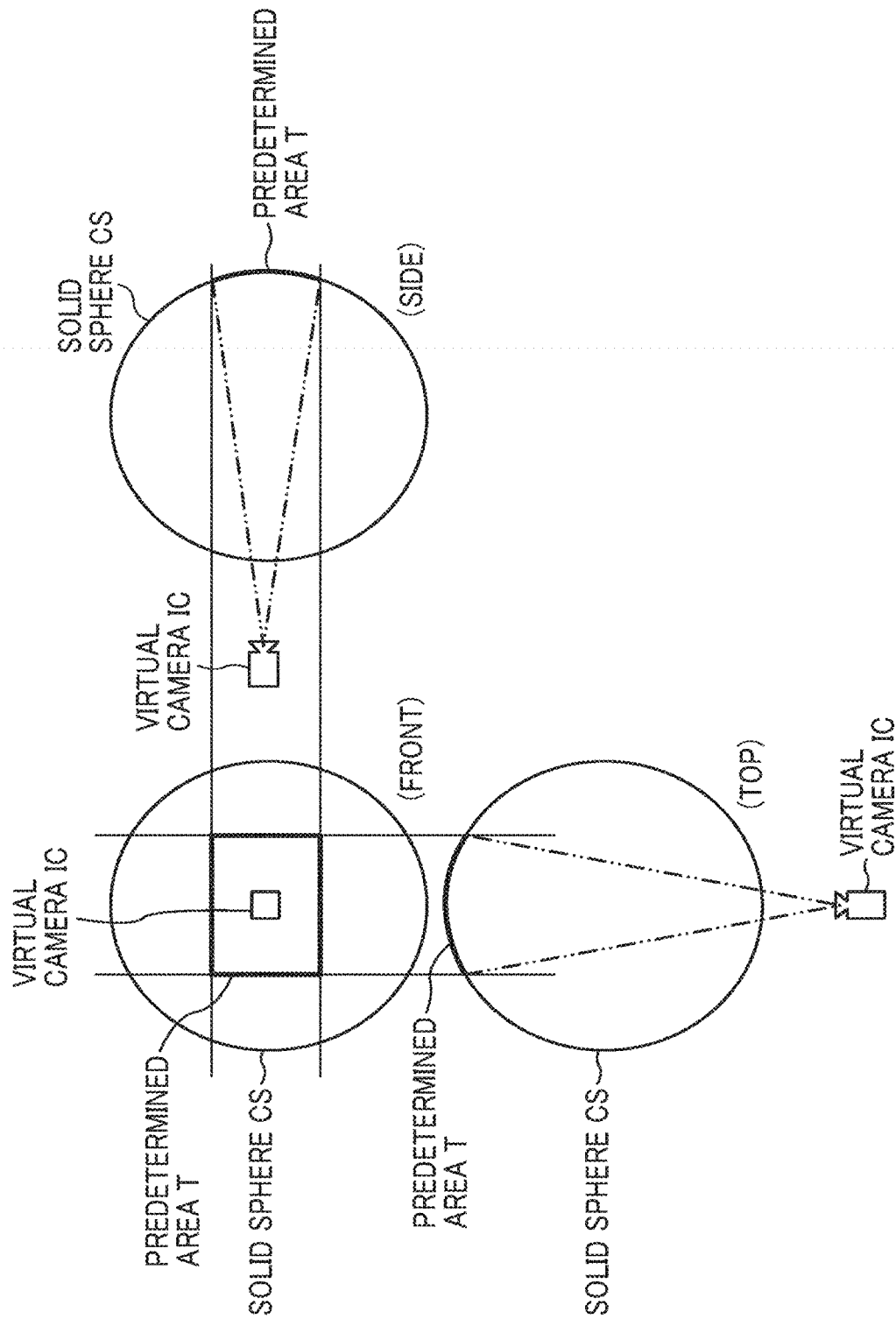

FIG. 14

IMAGE TYPE MANAGEMENT TABLE

| IMAGE DATA ID | IP ADDRESS OF SENDER TERMINAL | SOURCE NAME (IMAGE TYPE INFORMATION) |
|---|---|---|
| RS001 | 1.2.1.3 | Video_Theta |
| RS002 | 1.2.2.3 | Video |
| RS003 | 1.3.1.3 | Video_Theta |
| RS004 | 1.2.1.4 | Video |
| RS005 | 1.3.1.4 | Video_Theta |
| ... | ... | ... |

FIG. 15

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 16

SESSION MANAGEMENT TABLE

| SESSION ID | IP ADDRESS OF PARTICIPATING TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

FIG. 17

IMAGE TYPE MANAGEMENT DB

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

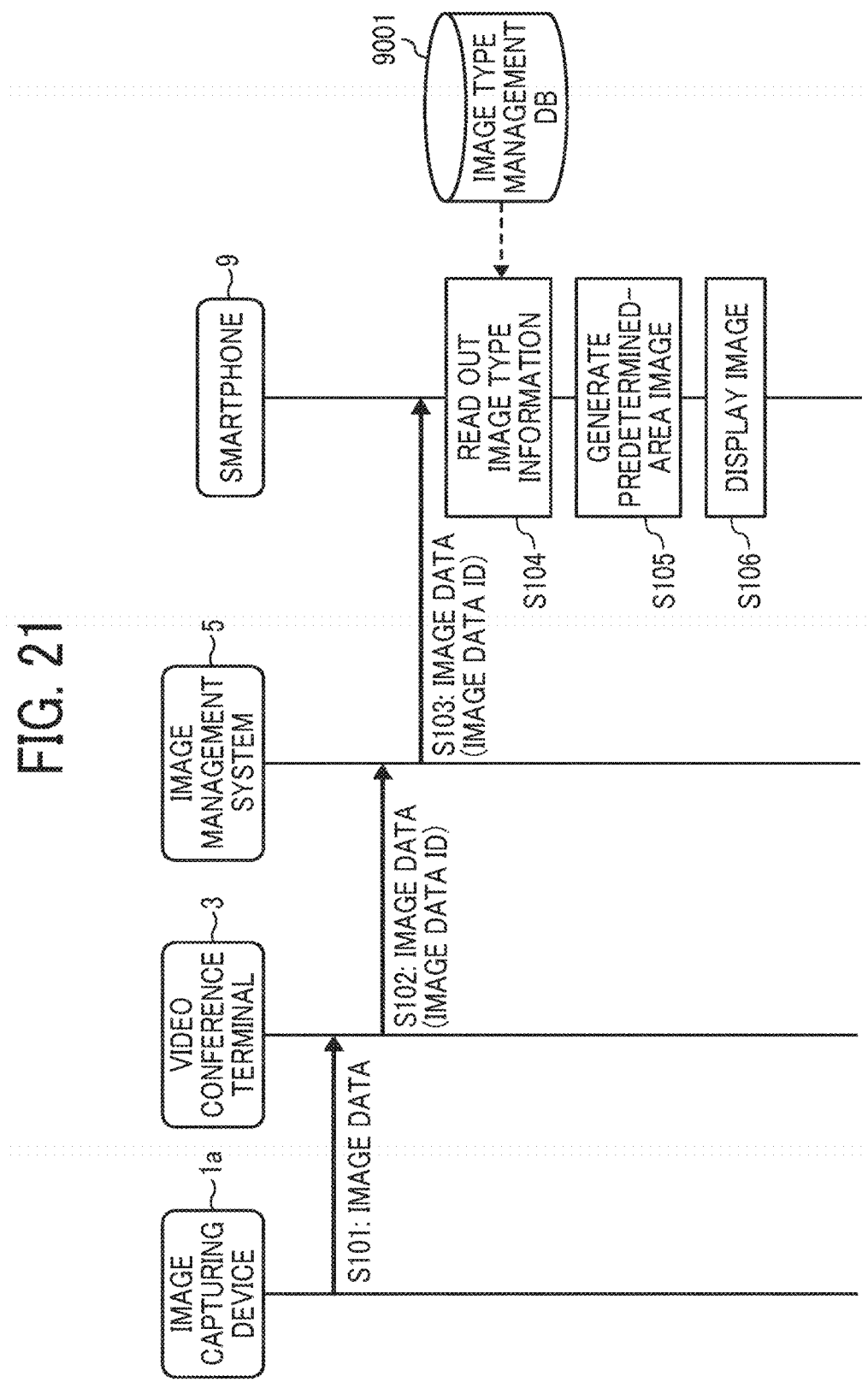

COMMUNICATION MANAGEMENT APPARATUS, METHOD AND COMPUTER-READABLE STORAGE MEDIUM FOR GENERATING IMAGE DATA IDENTIFICATION INFORMATION COMMUNICATION

CROSS-REFERENCE TO RELATED APPLICATIONS

This patent application is a continuation of U.S. patent application Ser. No. 15/707,553, filed on Sep. 18, 2017, which is based on and claims priority pursuant to 35 U.S.C. § 119(a) to Japanese Patent Application Nos. 2016-193188, filed on Sep. 30, 2016, 2017-120609, filed on Jun. 20, 2017, and 2017-175340, filed on Sep. 13, 2017 in the Japan Patent Office, the entire disclosures of which are hereby incorporated by reference herein.

BACKGROUND

Technical Field

The present disclosure relates to a communication management apparatus, a communication system, a communication management method, and a non-transitory computer-readable storage medium.

Description of the Related Art

Video conference systems are now in widespread use, allowing users at remote places to hold a meeting via a communication network such as the Internet. In such video conference systems, a communication terminal for a remote conference system is provided in a conference room where attendants of one party in a remote conference are attending. This communication terminal collects an image or video of the conference room including the attendants and sound such as speech made by the attendants, and transmits digital data converted from the collected image (video) and/or sound to the other party's terminal provided at a different conference room. Based on the transmitted digital data, the other party's terminal displays images on a display or outputs audio from a speaker in the different conference room to enable video calling. This enables to carry out a conference among remote sites, in a state close to an actual conference.

On the other hand, a technique is known that connects, to a communication terminal, an image capturing device that is capable of capturing a full spherical panoramic image in real time, and distributes the full spherical panoramic image from the image capturing device to each communication terminal of the other party. Each communication terminal sequentially converts the received full spherical panoramic image to a rectangular flat image, and displays the flat image on a display or the like.

SUMMARY

A communication management apparatus includes a receiver to receive image type information indicating a type of an image from a first communication terminal; circuitry to generate image data identification information for identifying image data to be transmitted from the first communication terminal to a second communication terminal, based on reception of the image type information; and a transmitter to transmit the image data identification information that is generated to the first communication terminal, and transmit the image data identification information that is generated and the image type information that is received to the second communication terminal.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1A is a left side view of an image capturing device according to an embodiment of the present disclosure;

FIG. 1B is a front view of the image capturing device of FIG. 1A;

FIG. 1C is a plan view of the image capturing device of FIG. 1A;

FIG. 3A is a view illustrating a front side of a hemispherical image captured by the image capturing device according to an embodiment of the present disclosure;

FIG. 3B is a view illustrating a back side of the hemispherical image captured by the image capturing device according to an embodiment of the present disclosure;

FIG. 3C is a view illustrating an image captured by the image capturing device represented by Mercator projection according to an embodiment of the present disclosure;

FIG. 5 is a view illustrating positions of a virtual camera and a predetermined area in a case in which the full spherical panoramic image is represented as a three-dimensional solid sphere according to an embodiment of the present disclosure;

FIG. 14 is a conceptual diagram illustrating an image type management table, according to an embodiment of the present disclosure;

FIG. 15 is a conceptual diagram illustrating an image capturing device management table, according to an embodiment of the present disclosure;

FIG. 16 is a conceptual diagram illustrating a session management table, according to an embodiment of the present disclosure;

FIG. 17 is a conceptual diagram illustrating an image type management table, according to an embodiment of the present disclosure;

FIG. 21 is a sequence diagram illustrating an image data transmission process in video calling, according to an embodiment of the present disclosure;

Figure 2:
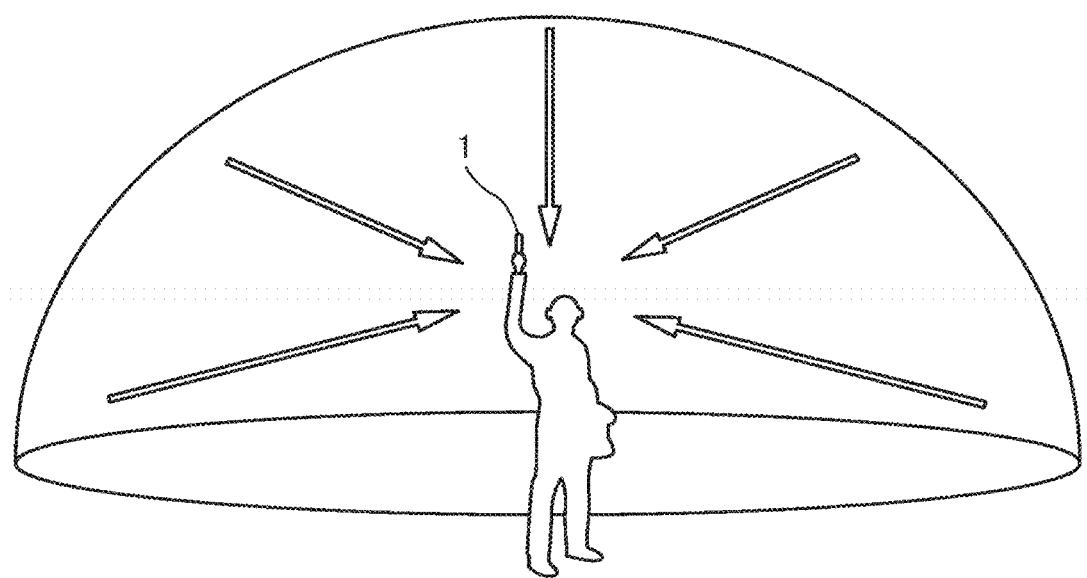
FIG. 2 illustrates how a user uses the image capturing device, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, embodiments of the present disclosure are described.

Overview of Embodiment

Generation of Full Spherical Panoramic Image

First, referring to FIGS. 1 to 7, a description is given of generating a full spherical panoramic image.

First, a description is given of an external view of an image capturing device 1, with reference to FIGS. 1A to 1C. The image capturing device 1 is a digital camera for capturing images from which a 360-degree full spherical panoramic image is generated. FIGS. 1A to 1C are respectively a left side view, a front view, and a plan view of the image capturing device 1.

As illustrated in FIG. 1A, the image capturing device 1 has a shape such that one can hold it with one hand. Further, as illustrated in FIGS. 1A to 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b, described later), each being capable of capturing a hemispherical image having an angle of view of 180 degrees or wider. Furthermore, as illustrated in FIG. 1B, an operation unit 115 such as a shutter button is provided on an opposite side of the front side of the image capturing device 1.

Hereinafter, a description is given of a situation where the image capturing device 1 is used with reference to FIG. 2. FIG. 2 illustrates an example of how a user uses the image capturing device 1. As illustrated in FIG. 2, for example, the image capturing device 1 is used for capturing objects surrounding the user who is holding the image capturing device 1 in his/her hand. In this case, the imaging elements 103a and 103b illustrated in FIGS. 1A to 1C capture the objects surrounding the user to obtain two hemispherical images.

Figure 4B:
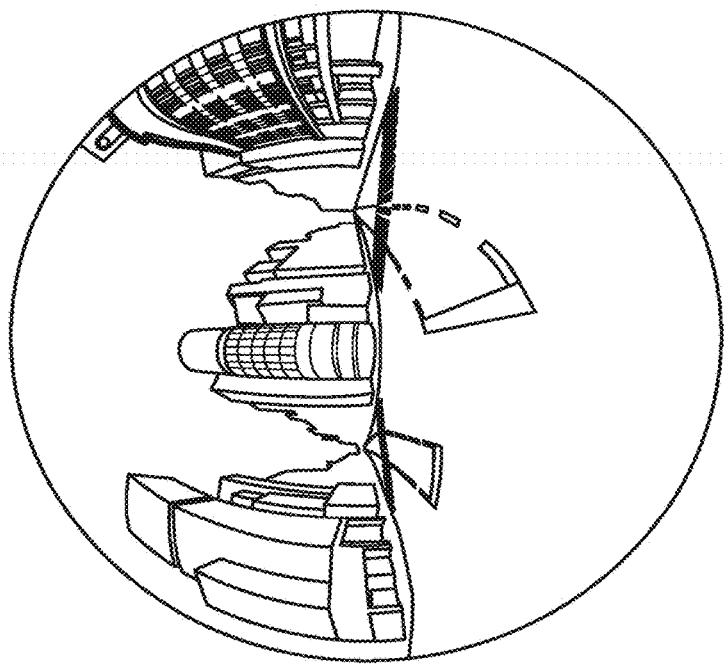
FIG. 4B is a view illustrating a full spherical panoramic image according to an embodiment of the present disclosure.
Figure 4A:
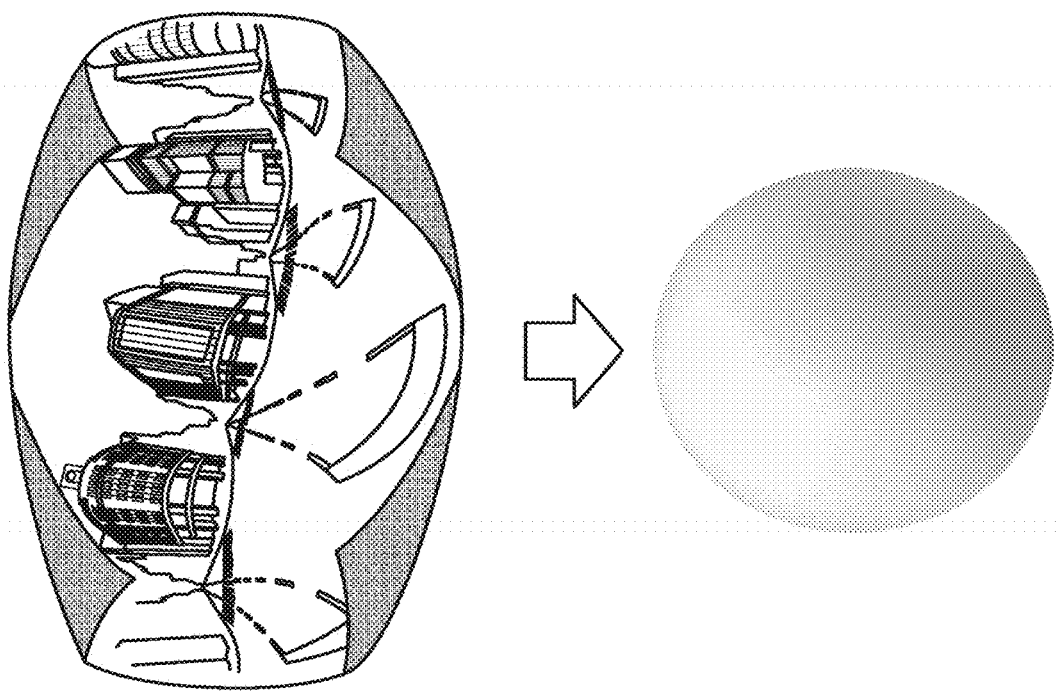
FIG. 4A illustrates how the image represented by Mercator projection covers a surface of a sphere according to an embodiment of the present disclosure.

Hereinafter, a description is given of an overview of an operation of generating the full spherical panoramic image from the image captured by the image capturing device 1, with reference to FIGS. 3A to 3C and FIGS. 4A and 4B. FIG. 3A is a view illustrating a hemispherical image (front side) captured by the image capturing device 1. FIG. 3B is a view illustrating a hemispherical image (back side) captured by the image capturing device 1. FIG. 3C is a view illustrating an image represented by Mercator projection. The image represented by Mercator projection as illustrated in FIG. 3C is referred to as a "Mercator image" hereinafter. FIG. 4A illustrates an example of how the Mercator image covers a surface of a sphere. FIG. 4B is a view illustrating the full spherical panoramic image.

As illustrated in FIG. 3A, an image captured by the imaging element 103a is a curved hemispherical image (front side) taken through the fisheye lens 102a described later. Also, as illustrated in FIG. 3B, an image captured by the imaging element 103b is a curved hemispherical image (back side) taken through the fisheye lens 102b described later. The hemispherical image (front side) and the hemispherical image (back side), which is reversed by 180-degree from each other, is combined by the image capturing device 1. Thus, the Mercator image as illustrated in FIG. 3C is generated.

The Mercator image is pasted on the sphere surface using Open Graphics Library for Embedded Systems (OpenGL ES) as illustrated in FIG. 4A. Thus, the full spherical panoramic image as illustrated in FIG. 4B is generated. In other words, the full spherical panoramic image is represented as the Mercator image facing toward a center of the sphere. It should be noted that OpenGL ES is a graphic library used for visualizing two-dimensional (2D) and three-dimensional (3D) data. The full spherical panoramic image is either a still image or a movie.

One may feel strange viewing the full spherical panoramic image, because the full spherical panoramic image is an image attached to the sphere surface. To resolve this strange feeling, an image of a predetermined area, which is a part of the full spherical panoramic image, is displayed as a flat image having fewer curves. The image of the predetermined area is referred to as a "predetermined-area image" hereinafter. Hereinafter, a description is given of displaying the predetermined-area image with reference to FIG. 5 and FIGS. 6A and 6B.

Figure 6A:
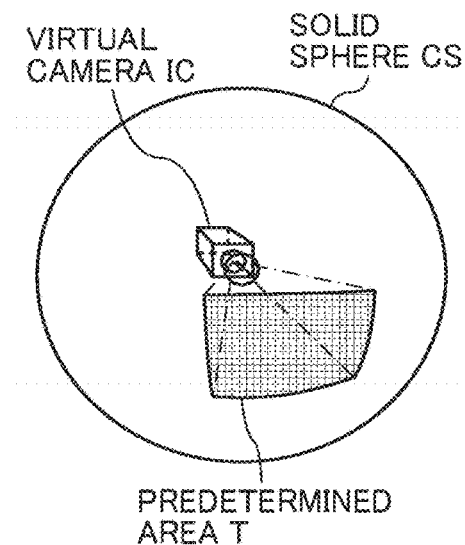
FIG. 6A is a perspective view of FIG. 5.
Figure 6B:
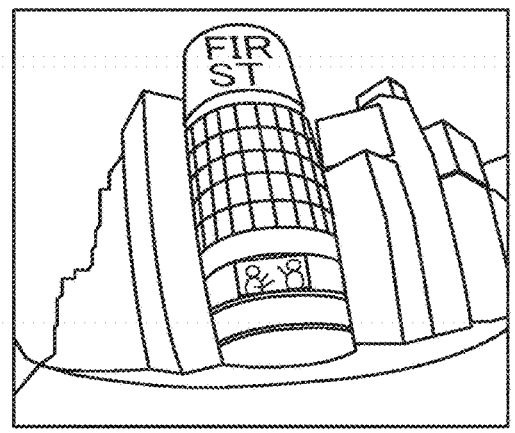
FIG. 6B is a view illustrating an image of the predetermined area on a display of a communication terminal according to an embodiment of the present disclosure.

FIG. 5 is a view illustrating positions of a virtual camera IC and a predetermined area T in a case in which the full spherical panoramic image is represented as a three-dimensional solid sphere. The virtual camera IC corresponds to a position of a point of view of a user who is viewing the full spherical panoramic image represented as the three-dimensional solid sphere. FIG. 6A is a perspective view of FIG. 5. FIG. 6B is a view illustrating the predetermined-area image displayed on a display. In FIG. 6A, the full spherical panoramic image illustrated in FIG. 4B is represented as a three-dimensional solid sphere CS. Assuming that the generated full spherical panoramic image is the solid sphere CS, the virtual camera IC is outside of the full spherical panoramic image as illustrated in FIG. 5. The predetermined area T in the full spherical panoramic image is an imaging area of the virtual camera IC. Specifically, the predetermined area T is specified by predetermined-area information indicating a position coordinate (x(rH), y(rV), angle of view α (angle)) including an angle of view of the virtual camera IC in a three-dimensional virtual space containing the full spherical panoramic image. Zooming of the predetermined area T is implemented by enlarging or reducing a range (arc) of the angle of view α. Further, zooming of the predetermined area T is implemented by moving the virtual camera IC toward or away from the full spherical panoramic image.

The predetermined-area image, which is an image of the predetermined area T illustrated in FIG. 6A, is displayed as an imaging area of the virtual camera IC, as illustrated in FIG. 6B. FIG. 6B illustrates the predetermined-area image represented by the predetermined-area information that is set by default. In another example, the predetermined-area image may be specified by an imaging area (X, Y, Z) of the virtual camera IC, i.e., the predetermined area T, rather than the predetermined-area information, i.e., the position coordinate of the virtual camera IC. A description is given hereinafter using the position coordinate (x(rH), y(rV), and an angle of view α (angle)) of the virtual camera IC.

Figure 7:
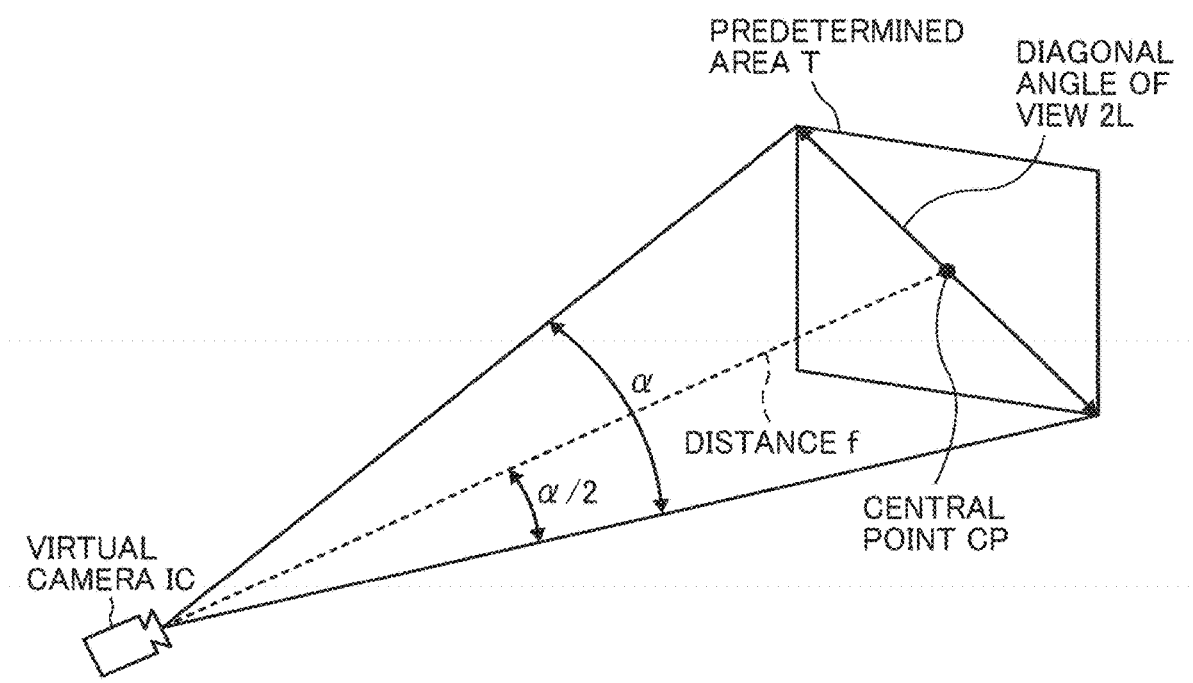
FIG. 7 is a view illustrating a relation between predetermined-area information and a predetermined-area image according to an embodiment of the present disclosure.

Hereinafter, a description is given of a relation between the predetermined-area information and the predetermined area T with reference to FIG. 7. FIG. 7 is a view illustrating a relation between the predetermined-area information and the predetermined area T. As illustrated in FIG. 7, a center point CP of 2L provides the parameters (x, y) of the predetermined-area information, where 2L denotes a diagonal angle of view of the predetermined area T specified the angle of view α of the virtual camera IC. Distance f is a distance from the virtual camera IC to the central point CP. L is a distance between the center point CP and a given vertex of the predetermined area T (2L is a diagonal line). In FIG. 7, a trigonometric function equation generally expressed by the following equation (1) is satisfied.

$$Lf=\tan(\alpha/2) \tag{Equation 1}$$

<Overview of Image Communication System>

Figure 8:
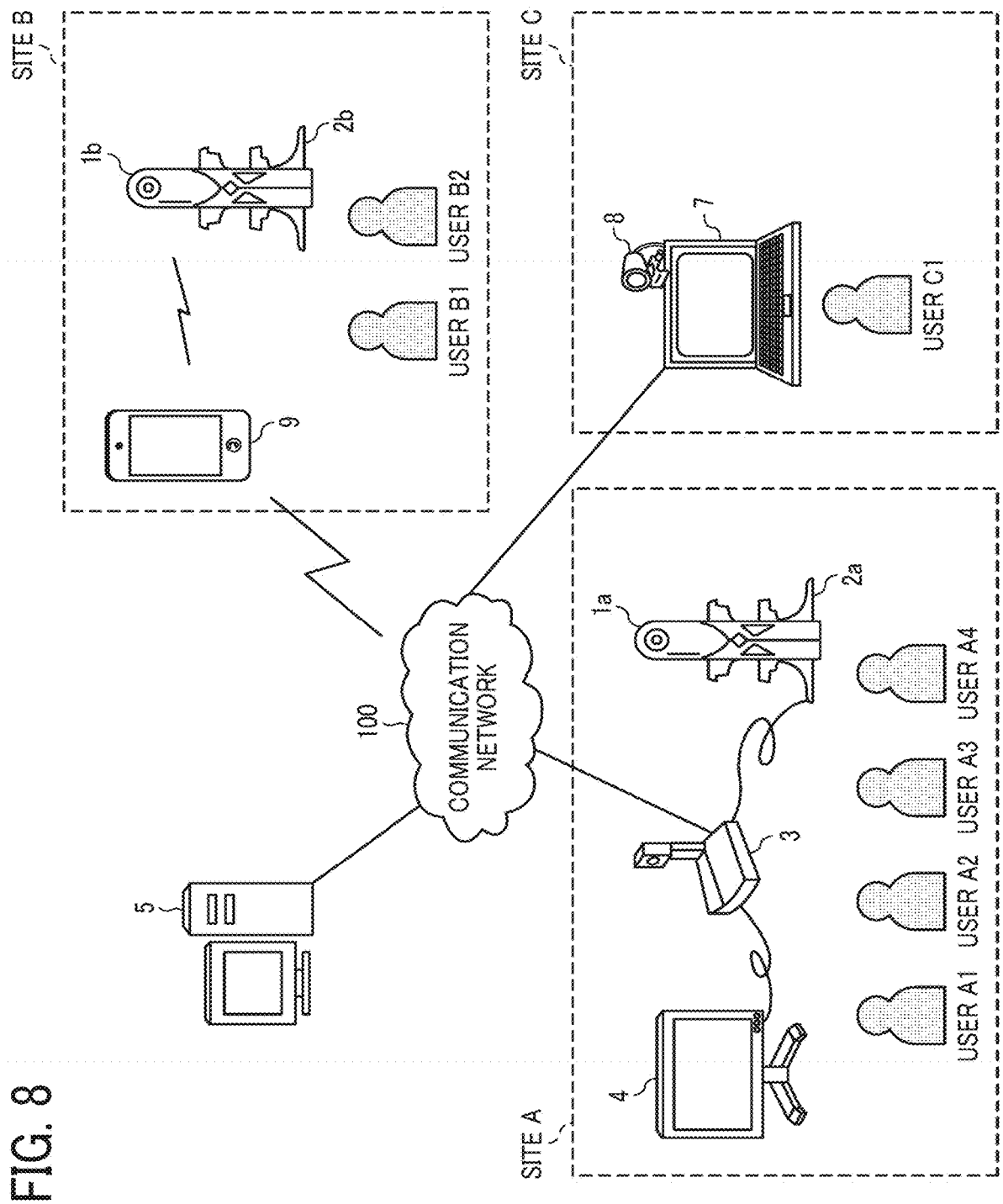
FIG. 8 is a schematic view illustrating an image communication system according to an embodiment of the present disclosure.

Hereinafter, a description is given of an overview of a configuration of an image communication system according to this embodiment with reference to FIG. 8. FIG. 8 is a schematic diagram illustrating a configuration of the image communication system according to this embodiment.

As illustrated in FIG. 8, the image communication system according to this embodiment includes an image capturing device 1a, an image capturing device 1b, a videoconference terminal 3, a communication management system 5, a persona computer (PC) 7, an image capturing device 8, and a smartphone 9. They communicate data with one another via a communication network 100 such as the Internet. The communication network 100 may be either a wireless network or a wired network.

The image capturing device 1a and the image capturing device 1b are each a special digital camera, which captures an image of a subject or surroundings to obtain two hemispherical images, from which a full spherical panoramic image is generated, as described above. By contrast, the image capturing device 8 is a general-purpose digital camera that captures an image of a subject or surroundings to obtain a general flat image.

The videoconference terminal 3 is a terminal dedicated to videoconferencing. The videoconference terminal 3 displays an image of video calling on a display 4 via a wired cable such as a universal serial bus (USB). The videoconference terminal 3 usually captures an image by a camera 312, which is described later. However, in a case in which the videoconference terminal 3 is connected to a cradle 2a on which the image capturing device 1a is mounted, the image capturing device 1a is preferentially used. Accordingly, two hemispherical images are obtained, from which a full spherical panoramic image is generated. When a wired cable is used for connecting the videoconference terminal 3 and the cradle 2a, the cradle 2a not only enables communications between the image capturing device 1a and the videoconference terminal 3 but also supplies power with the image capturing device 1a and holds the image capturing device 1a. In this disclosure, the image capturing device 1a, the cradle 2a, the videoconference terminal 3, and the display 4 are located at the same site A. Further, in the site A, four users A1, A2, A3 and A4 are participating in video calling.

The communication management system 5 manages communication of videoconference terminal 3, the PC 7 and the smartphone 9. Further, the communication management system 5 manages types (a general image type and a special image type) of image data exchanged. In this disclosure, the special image is a full spherical panoramic image. The communication management system 5 is located, for example, at a service provider that provides video communication service. The communication management system 5 may be configured as a single computer or a plurality of computers to which divided portions (functions, means, or storages) are arbitrarily allocated.

The PC 7 performs video calling with the image capturing device 8 connected thereto. In this disclosure, the PC 7 and the image capturing device 8 are located at the same site C. At the site C, one user C is participating in video calling.

The smartphone 9 includes a display 917, which is described later, and displays an image of video calling on the display 917. The smartphone 9 includes a complementary metal oxide semiconductor (CMOS) sensor 905, and usually captures an image with the CMOS sensor 905. In addition, the smartphone 9 is also capable of obtaining data of two hemispherical images captured by the image capturing device 1b, based on which the full spherical panoramic image is generated, by wireless communication such as Wireless Fidelity (Wi-Fi) and Bluetooth (registered trademark). In a case in which wireless communication is used for obtaining two hemispherical images, a cradle 2b just supplies power with the image capturing device 1b and holds the image capturing device 1b. In this disclosure, the image capturing device 1b, the cradle 2b, and the smartphone 9 are located at the same site B. Further, in the site B, two users B1 and B2 are participating in video calling.

The videoconference terminal 3, the PC 7 and the smartphone 9 are each an example of a communication terminal. OpenGL ES is installed in each of those communication terminals to enable each communication terminal to generate predetermined-area information that indicates a partial area of a full spherical panoramic image, or to generate a predetermined-area image from a full spherical panoramic image that is transmitted from a different communication terminal.

The arrangement of the terminals, apparatuses and users illustrated in FIG. 8 is just an example, and any other suitable arrangement will suffice. For example, in the site C, an image capturing device that is capable of performing image capturing for a full spherical panoramic image may be used in place of the image capturing device 8. In addition, examples of the communication terminal include a digital television, a smartwatch, and a car navigation device. Hereinafter, any arbitrary one of the image capturing device 1a and the image capturing device 1b is referred to as "the image capturing device 1".

Hardware Configuration According to Embodiment

Hereinafter, a description is given of hardware configurations of the image capturing device 1, the videoconference terminal 3, the communication management system 5, the PC 7, and the smartphone 9 according to this embodiment with reference to FIGS. 9 to 12. Since the image capturing device 8 is a general-purpose camera, a detailed description thereof is omitted.

Hardware Configuration of Image Capturing Device 1

Figure 9:
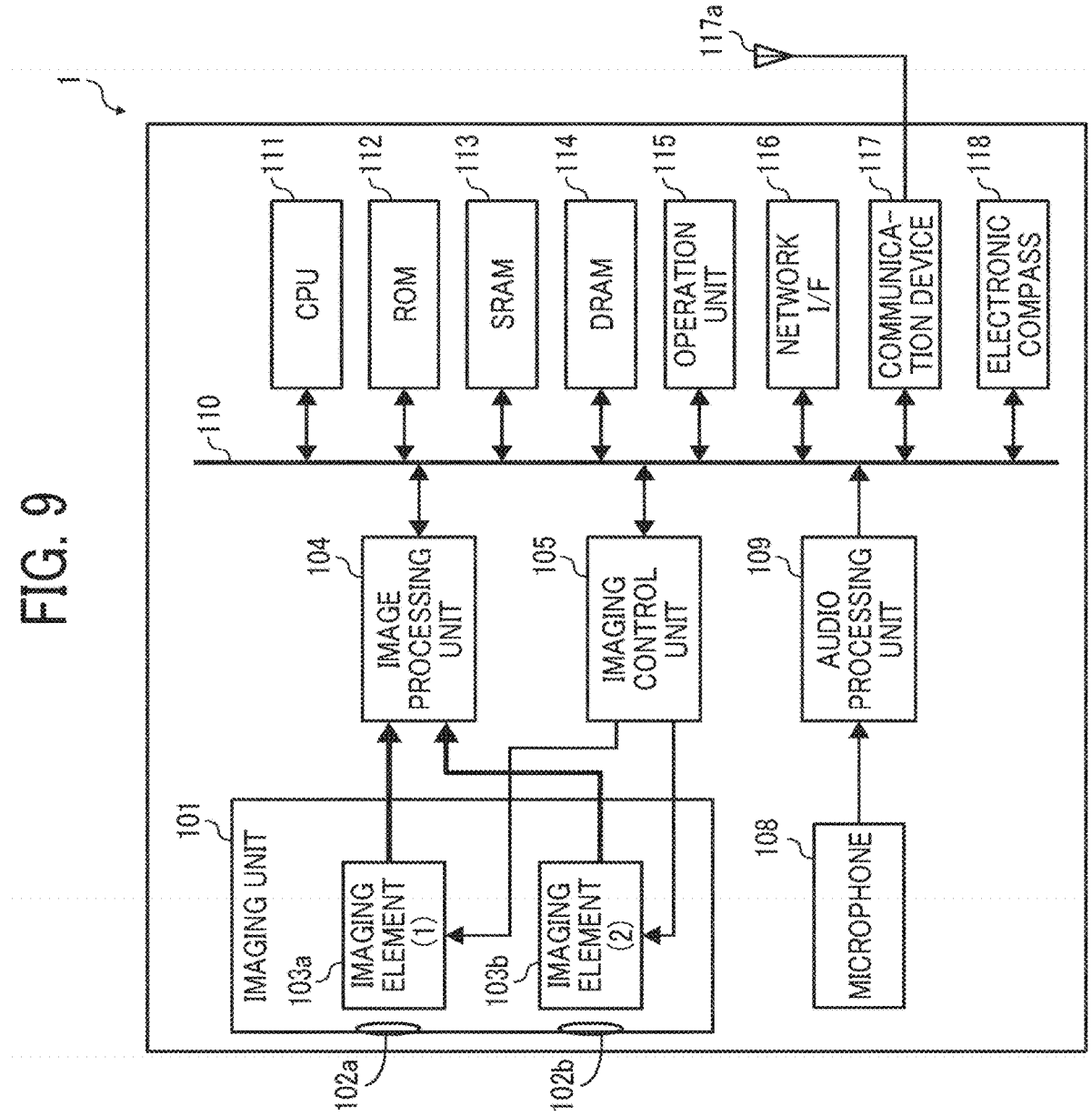
FIG. 9 is a schematic block diagram illustrating a hardware configuration of the image capturing device according to an embodiment of the present disclosure.

First, a description is given of a hardware configuration of the image capturing device 1 with reference to FIG. 9. FIG. 9 is a block diagram illustrating a hardware configuration of the image capturing device 1. A description is given hereinafter of a case in which the image capturing device 1 is a full spherical (omnidirectional) image capturing device having two imaging elements. However, the image capturing device 1 may include any suitable number of imaging elements, providing that it includes at least two imaging elements. In addition, the image capturing device 1 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the image capturing device 1.

As illustrated in FIG. 9, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, an operation unit 115, a network interface (I/F) 116, a communication device 117, and an antenna 117a.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an image sensor such as a CMOS sensor and a charge-coupled device (CCD) sensor, a timing generation circuit, and a group of registers. The image sensor converts an optical image formed by the fisheye lenses 102a and 102b into electric signals to output image data. The timing generation circuit generates horizontal or vertical synchronization signals, pixel clocks and the like for the image sensor. Various commands, parameters and the like for operations of the imaging elements 103a and 103b are set in the group of registers.

Each of the imaging elements 103a and 103b of the imaging unit 101 is connected to the image processing unit 104 via a parallel I/F bus. In addition, each of the imaging elements 103a and 103b of the imaging unit 101 is connected to the imaging control unit 105 via a serial I/F bus such as an I2C bus. The image processing unit 104 and the imaging control unit 105 are each connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 acquires image data from each of the imaging elements 103a and 103b via the parallel I/F bus and performs predetermined processing on each image data. Thereafter, the image processing unit 104 combines these image data to generate data of the Mercator image as illustrated in FIG. 3C.

The imaging control unit 105 usually functions as a master device while the imaging elements 103a and 103b each usually functions as a slave device. The imaging control unit 105 sets commands and the like in the group of registers of the imaging elements 103a and 103b via the I2C bus. The imaging control unit 105 receives necessary commands and the like from the CPU 111. Further, the imaging control unit 105 acquires status data and the like of the group of registers of the imaging elements 103a and 103b via the I2C bus. The imaging control unit 105 sends the acquired status data and the like to the CPU 111.

The imaging control unit 105 instructs the imaging elements 103a and 103b to output the image data at a time when the shutter button of the operation unit 115 is pressed. The image capturing device 1 may display a preview image on a display (e.g., a display of the videoconference terminal 3) or may support displaying movie. In this case, the image data are continuously output from the imaging elements 103a and 103b at a predetermined frame rate (frames per minute).

Furthermore, the imaging control unit 105 operates in cooperation with the CPU 111 to synchronize times when the imaging elements 103a and 103b output the image data. It should be noted that although in this embodiment, the image capturing device 1 does not include a display unit (display), the image capturing device 1 may include the display.

The microphone 108 converts sounds to audio data (signal). The audio processing unit 109 acquires the audio data from the microphone 108 via an I/F bus and performs predetermined processing on the audio data.

The CPU 111 controls overall operation of the image capturing device 1 and performs necessary processing. The ROM 112 stores various programs for the CPU 111. The SRAM 113 and the DRAM 114 each operates as a work memory to store programs loaded from the ROM 112 for execution by the CPU 111 or data in current processing. More specifically, the DRAM 114 stores image data currently processed by the image processing unit 104 and data of the Mercator image on which processing has been performed.

The operation unit 115 collectively refers to various operation keys, a power switch, the shutter button, and a touch panel having functions of both displaying information and receiving input from a user, which may be used in combination. The user operates the operation keys to input various photographing modes or photographing conditions.

The network I/F 116 collectively refers to an interface circuit such as a USB I/F that allows the image capturing device 1 to communicate data with an external media such as an SD card or an external personal computer. The network I/F 116 supports at least one of wired and wireless communications. The data of the Mercator image, which is stored in the DRAM 114, is stored in the external media via the network I/F 116 or transmitted to the external device such as the videoconference terminal 3 via the network I/F 116, as needed.

The communication device 117 communicates data with an external device such as the videoconference terminal 3 via the antenna 117a of the image capturing device 1 by near distance wireless communication such as Wi-Fi and Near Field Communication (NFC). The communication device 117 is also capable of transmitting the data of Mercator image to the external device such as the videoconference terminal 3.

The electronic compass 118 calculates an orientation and a tilt (roll angle) of the image capturing device 1 from the Earth's magnetism to output orientation and tilt information. This orientation and tilt information is an example of related information, which is metadata described in compliance with Exif. This information is used for image processing such as image correction of captured images. Further, the related information also includes a date and time when the image is captured by the image capturing device 1, and a size of the image data.

<Hardware Configuration of Videoconference Terminal 3>

Figure 10:
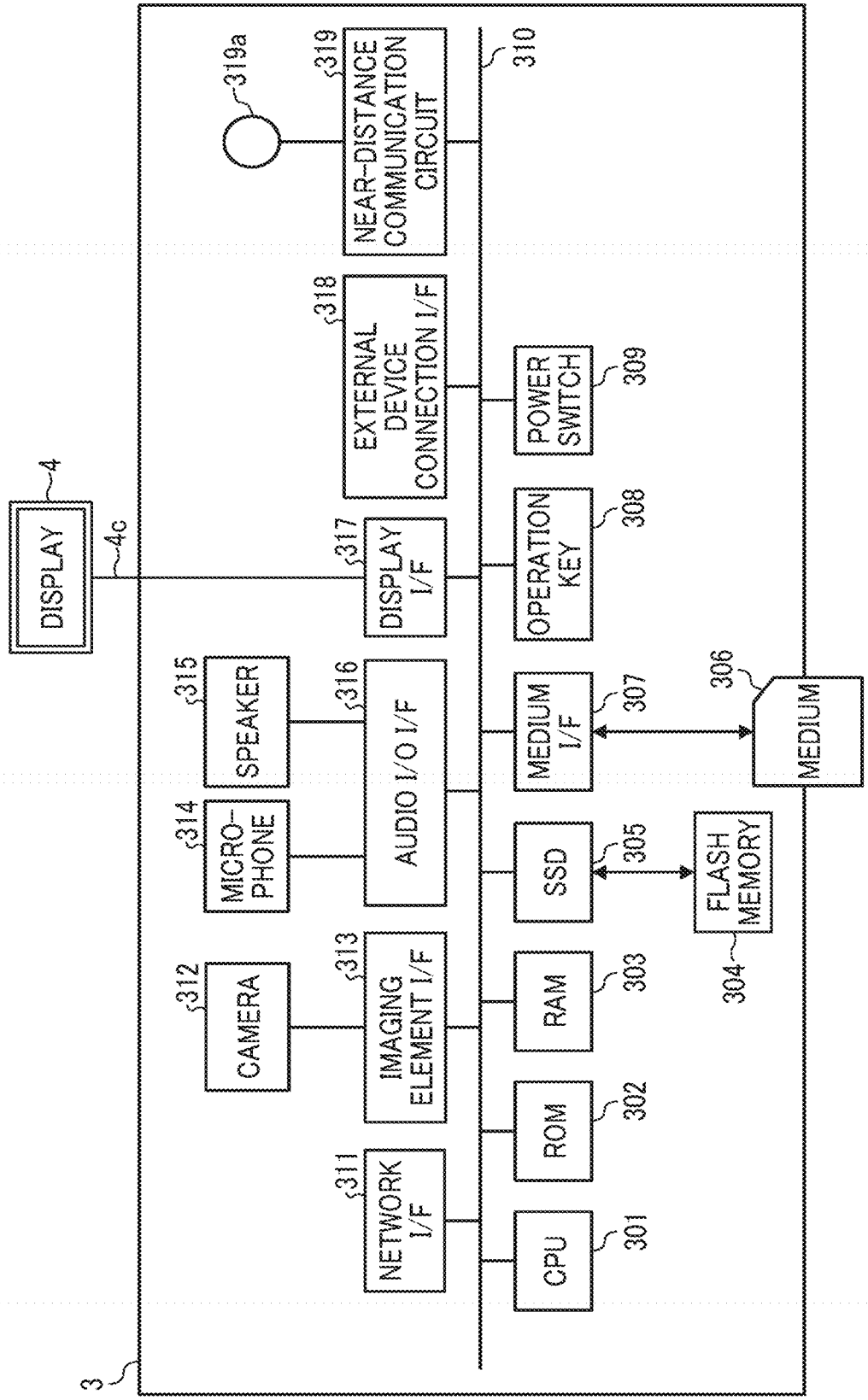
FIG. 10 is a schematic block diagram illustrating a hardware configuration of a videoconference terminal, according to an embodiment of the present disclosure.

Hereinafter, a description is given of a hardware configuration of the videoconference terminal 3 with reference to FIG. 10. FIG. 10 is a block diagram illustrating a hardware configuration of the videoconference terminal 3. As illustrated in FIG. 10, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output interface 316, a display I/F 317, an external device connection I/F 318, a near-distance communication circuit 319, and an antenna 319a for the near-distance communication circuit 319.

The CPU 301 controls overall operation of the videoconference terminal 3. The ROM 302 stores a control program for operating the CPU 301 such as an Initial Program Loader (IPL). The RAM 303 is used as a work area for the CPU 301. The flash memory 304 stores various data such as a communication control program, image data, and audio data. The SSD 305 controls reading or writing of various data to and from the flash memory 304 under control of the CPU 301. A hard disk drive (HDD) may be used in place of the SSD 305. The medium I/F 307 controls reading or writing (storing) of data with respect to a recording medium 306 such as a flash memory. The operation key 308 is operated by a user to input a user instruction such as a user selection of a destination of the videoconference terminal 3. The power switch 309 is a switch that turns on or off the power of the videoconference terminal 3.

The network I/F 311 enables communication of data with an external device through the communication network 100 such as the Internet. The camera 312 is an example of an imaging device capable of capturing a subject under control of the CPU 301 to obtain image data, and is incorporated in the videoconference terminal 3. The imaging element I/F 313 is a circuit that controls driving of the camera 312. The microphone 314 is an example of an audio collecting device capable of inputting audio, and is incorporated in the videoconference terminal 3. The audio input/output interface 316 is a circuit for controlling input and output of audio signals between the microphone 314 and the speaker 315 under control of the CPU 301. The display I/F 317 is a circuit for transmitting image data to an external display 320 under control of the CPU 301. The external device connection I/F 318 is an interface circuit that connects the videoconference terminal 3 to various external devices. The near-distance communication circuit 319 is a communication circuit that communicates in compliance with the NFC (registered trademark), the Bluetooth (registered trademark) and the like.

The bus line 310 may be an address bus or a data bus, which electrically connects various elements such as the CPU 301 illustrated in FIG. 10.

The display 4 is an example of a display unit, such as a liquid crystal or organic electroluminescence (EL) display that displays an image of a subject, an operation icon, or the like. The display 4 is connected to the display IN 317 by a cable 4c. The cable 4c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video) of a subject to electronic data through photoelectric conversion. As the solid-state imaging element, for example, a CMOS sensor or a CCD sensor is used. The external device connection I/F 318 is capable of connecting an external device such as an external camera, an external microphone, or an external speaker through a USB cable or the like. In a case in which an external camera is connected, the external camera is driven in preference to the built-in camera 312 under control of the CPU 301. Similarly, in a case in which an external microphone is connected or an external speaker is connected, the external microphone or the external speaker is driven in preference to the built-in microphone 314 or the built-in speaker 315 under control of the CPU 301.

The recording medium 306 is removable from the videoconference terminal 3. In addition to the flash memory 304, any suitable nonvolatile memory, such as an electrically erasable and programmable ROM (EEPROM), may be used, provided that it reads or writes data under control of CPU 301.

Hardware Configuration of Communication Management System 5 and PC 7

Figure 11:
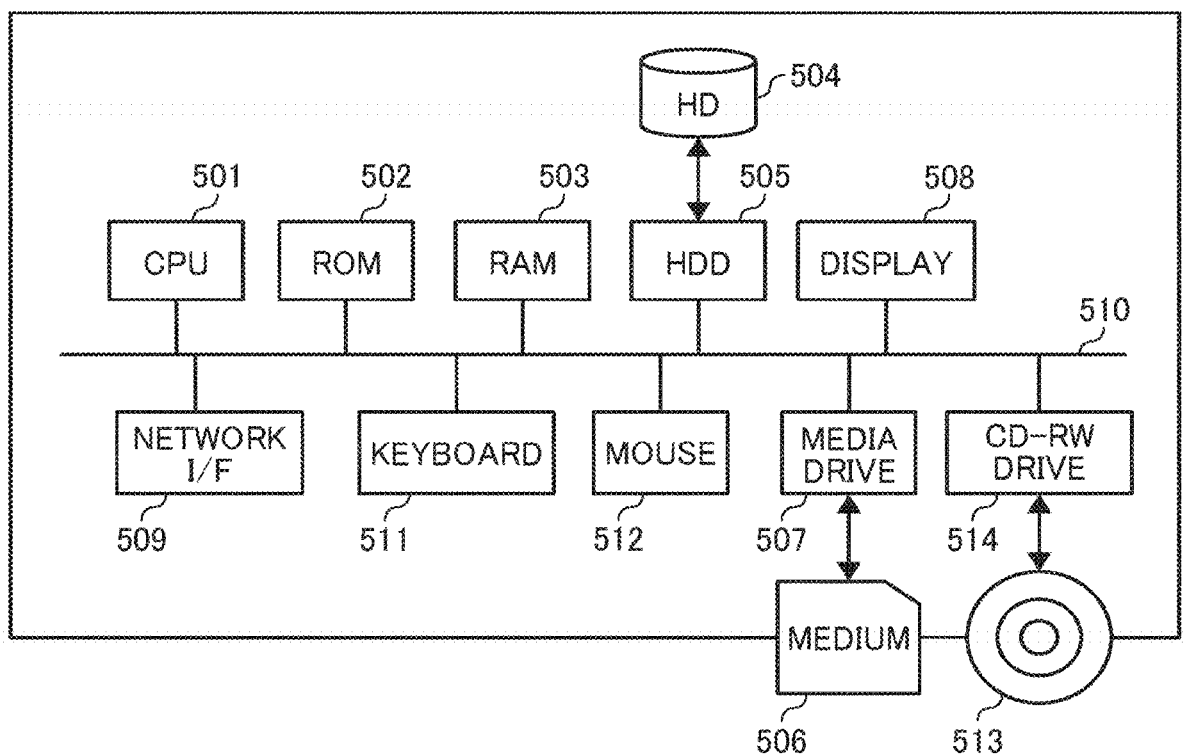
FIG. 11 is a schematic block diagram illustrating a hardware configuration of any one of a communication management system and a personal computer (PC), according to an embodiment of the present disclosure.

Hereinafter, a description is given of hardware configurations of the communication management system 5 and the PC 7, with reference to FIG. 11. FIG. 11 is a block diagram illustrating a hardware configuration of any one of the communication management system 5 and the PC 7. In this disclosure, both the communication management system 5 and the PC 7 are implemented by a computer. Therefore, a description is given of a configuration of the communication management system 5, and the description of a configuration of the PC 7 is omitted, having the same or substantially the same configuration as that of the communication management system 5.

The communication management system 5 includes a CPU 501, a ROM 502, a RAM 503, an HD 504, a hard disc drive (HDD) 505, a media drive 507, a display 508, a network I/F 509, a keyboard 511, a mouse 512, a compact-disc rewritable (CD-RW) drive 514, and a bus line 510. The CPU 501 controls entire operation of the communication management system 5. The ROM 502 stores a control program for controlling the CPU 501 such as an IPL. The RAM 503 is used as a work area for the CPU 501. The HD 504 stores various data such as programs for the communication management system 5. The HDD 505 controls reading and writing of data from and to the HD 504 under control of the CPU 501. The media drive 507 controls reading and writing (storing) of data from and to a recording medium 506 such as a flash memory. The display 508 displays various types of information such as a cursor, menus, windows, characters, or images. The network I/F 509 enables communication of data with an external device through the communication network 100. The keyboard 511 includes a plurality of keys to allow a user to input characters, numbers, and various types of instructions. The mouse 512 allows a user to input an instruction for selecting and executing various functions, selecting a target for processing, or moving the cursor. The CD-RW drive 514 controls reading and writing of data from and to a CD-RW 513, which is one example of a removable recording medium. The bus line 510 electrically connects those elements of the communication management system 5 to each other as illustrated in FIG. 11. Examples of the bus line 510 include an address bus and a data bus.

Hardware Configuration of Smartphone 9

Figure 12:
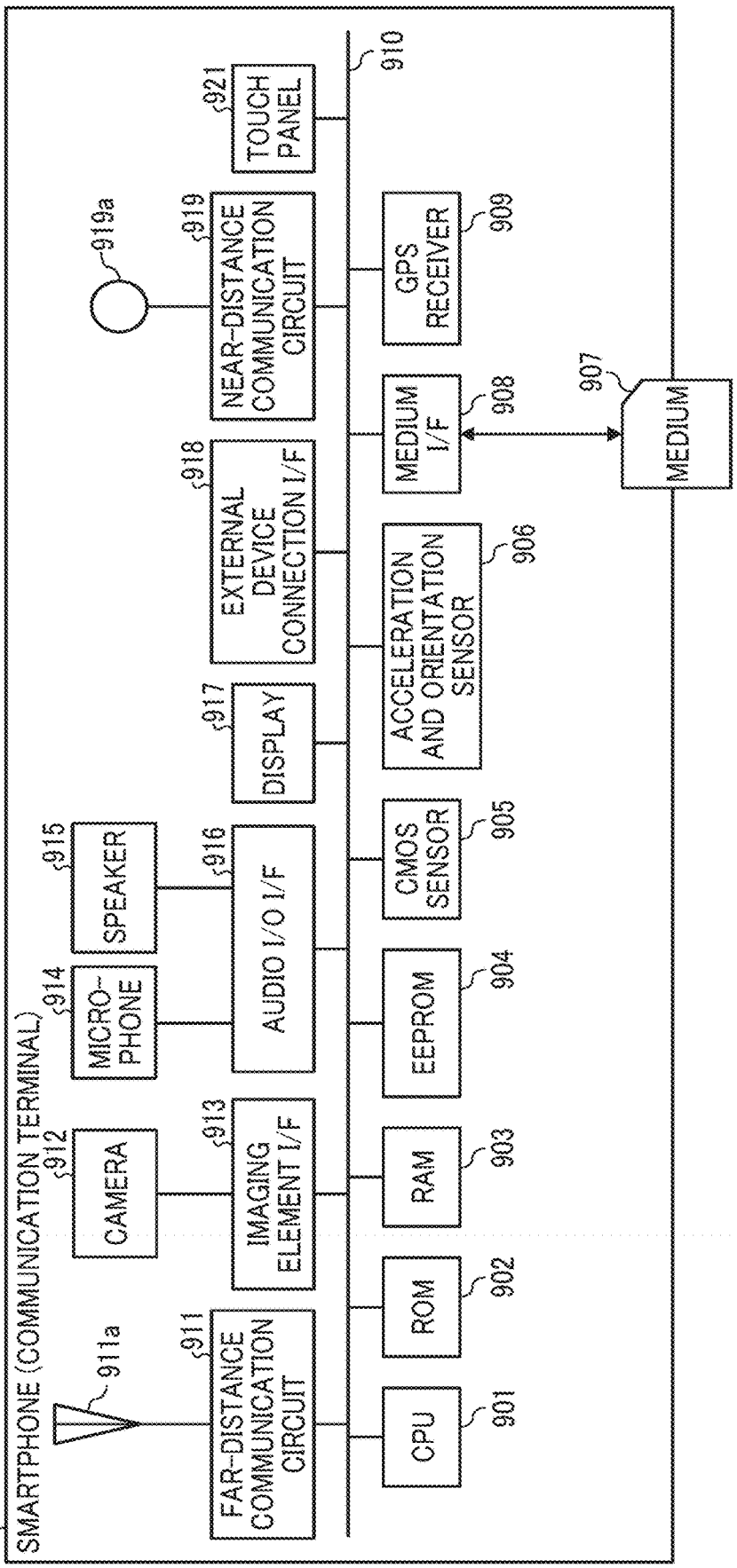
FIG. 12 is a schematic block diagram illustrating a hardware configuration of a smartphone, according to an embodiment of the present disclosure.

Hereinafter, a description is given of hardware of the smartphone 9 with reference to FIG. 12. FIG. 12 is a block diagram illustrating a hardware configuration of the smartphone 9. As illustrated in FIG. 12, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls overall operation of the smartphone 9. The ROM 902 stores a program for controlling the CPU 901, such as IPL. The RAM 903 is used as a work area for the CPU 901. The EEPROM 904 reads or writes various data such as a control program for the smartphone 9 under control of the CPU 901. The CMOS sensor 905 captures an object under control of the CPU 901 to obtain image data. The acceleration and orientation sensor 906 includes various sensors such as an electromagnetic compass or gyrocompass for detecting geomagnetism, and an acceleration sensor. The medium I/F 908 controls reading or writing of data with respect to a recording medium 907 such as a flash memory. The GPS receiver 909 receives a GPS signal from a GPS satellite.

The smartphone 9 further includes a far-distance communication circuit 911, a camera 912, an imaging element I/F 913, a microphone 914, a speaker 915, an audio input/output interface 916, a display 917, an external device connection I/F 918, a near-distance communication circuit 919, an antenna 919*a* for the near-distance communication circuit 919, and a touch panel 921.

The far-distance communication circuit 911 is a circuit that communicates with other device through the communication network 100. The camera 912 is an example of imaging device capable of capturing a subject under control of the CPU 901 to obtain image data, and is incorporated in the smartphone 9. The imaging element I/F 913 is a circuit that controls driving of the camera 912. The microphone 914 is an example of audio collecting device capable of inputting audio, and is incorporated in the smartphone 9. The audio input/output interface 916 is a circuit for controlling input and output of audio signals between the microphone 914 and the speaker 915 under control of the CPU 901. The display 917 is an example of a display unit, such as a liquid crystal or organic electro luminescence (EL) display that displays an image of a subject, an operation icon, or the like. The external device connection I/F 918 is an interface circuit that connects the smartphone 9 to various external devices. The near-distance communication circuit 919 is a communication circuit that communicates in compliance with the NFC, the Bluetooth and the like. The touch panel 921 is an example of an input device to operate a smartphone 9 by touching a screen of the display 917.

The smartphone 9 further includes a bus line 910. Examples of the bus line 910 include an address bus and a data bus, which electrically connects the elements such as the CPU 901.

It should be noted that a recording medium such as a CD-ROM or a hard disk storing any one of the above-described programs may be distributed domestically or overseas as a program product.

Functional Configuration According to Embodiment

Figure 13A:
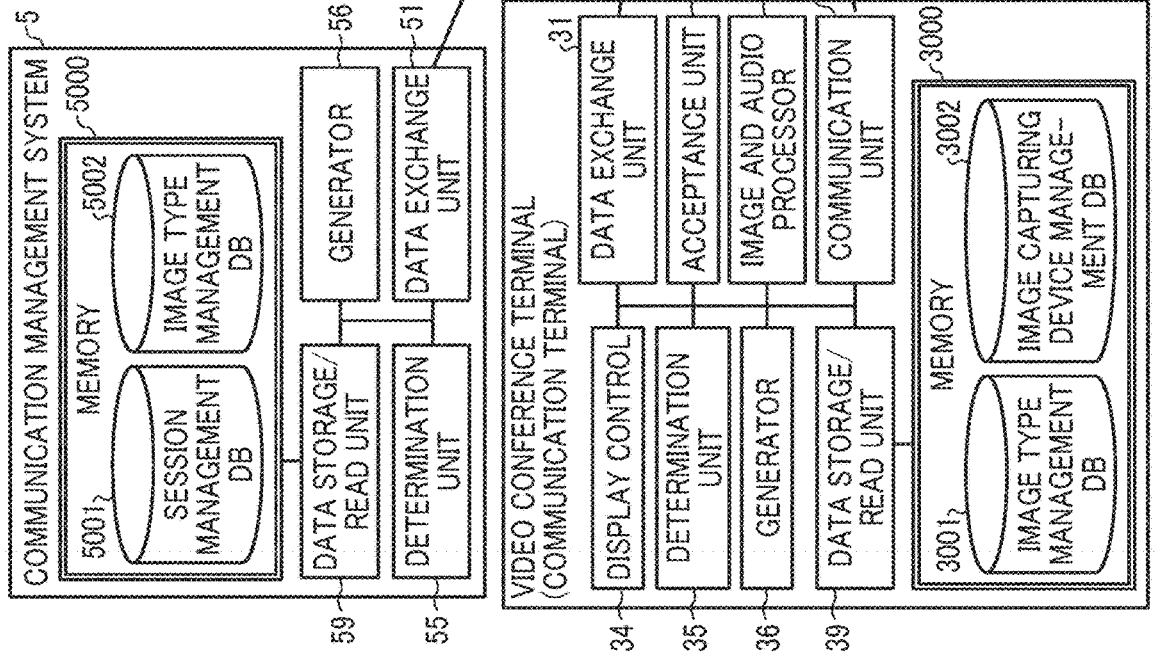
FIGS. 13A and 13B are a schematic block diagram illustrating a functional configuration of the image communication system according to an embodiment of the present disclosure.
Figure 13B:
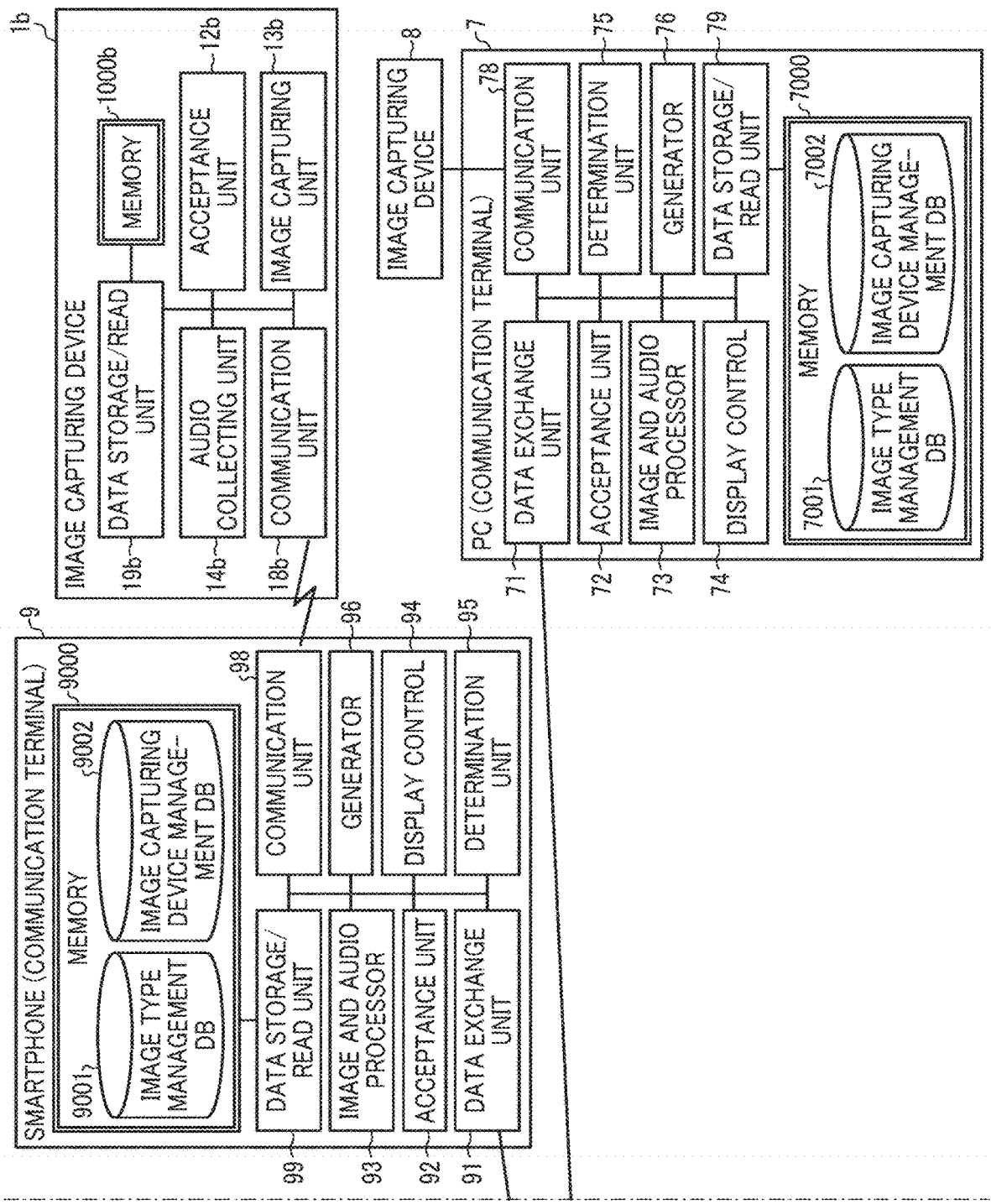

Hereinafter, a description is given of a functional configuration of the image communication system according to this embodiment, with reference to FIGS. 13A and 13B to FIG. 17. FIGS. 13A and 13B are a block diagram illustrating functional configurations of the image capturing devices 1*a* and 1*b*, the videoconference terminal 3, the communication management system 5, the PC 7, and the smartphone 9, which constitute a part of the image communication system according this embodiment.

Functional Configuration of Image Capturing Device 1a

As illustrated in FIG. 13A, the image capturing device 1*a* includes an acceptance unit 12*a*, an image capturing unit 13*a*, an audio collecting unit 14*a*, a communication unit 18*a*, and a data storage/read unit 19*a*. These units are functions that are implemented by or that are caused to function by operating any of the elements illustrated in FIG. 9 in cooperation with the instructions of the CPU 111 according to the image capturing device control program expanded from the SRAM 113 to the DRAM 114.

The image capturing device 1*a* further includes a memory 1000*a*, which is implemented by the ROM 112, the SRAM 113, and the DRAM 114 illustrated in FIG. 9. The memory 1000a stores therein a globally unique identifier (GUID) identifying the own device (i.e., the image capturing device 1a).

(Each functional unit of image capturing device 1a)

Hereinafter, referring to FIG. 9 and FIGS. 13A and 13B, a detailed description is given of each functional unit of the image capturing device 1a according to the embodiment.

The acceptance unit 12a of the image capturing device 1a is implemented by the operation unit 115 illustrated in FIG. 9, when operating under control of the CPU 111. The acceptance unit 12a receives an instruction input from the operation unit 115 according to a user operation.

The image capturing unit 13a is implemented by the imaging unit 101, the image processing unit 104, and the imaging control unit 105, illustrated in FIG. 9, when operating under control of the CPU 111. The image capturing unit 13a captures an image of a subject or surroundings to obtain captured-image data.

The audio collecting unit 14a is implemented by the microphone 108 and the audio processing unit 109 illustrated in FIG. 9, when operating under control of the CPU 111. The audio collecting unit 14a collects sounds around the image capturing device 1a.

The communication unit 18a, which is implemented by instructions of the CPU 111, communicates data with a communication unit 38 of the videoconference terminal 3 using the near-distance wireless communication technology in compliance with such as NFC, Bluetooth, or Wi-Fi.

The data storage/read unit 19a, which is implemented by instructions of the CPU 111 illustrated in FIG. 9, stores data or information in the memory 1000a and read out data or information from the memory 1000a.

Functional Configuration of Image Capturing Device 1b

The image capturing device 1b has the same or substantially the same functions as those of the image capturing device 1a. Specifically, the image capturing device 1b includes an acceptance unit 12b, an image capturing unit 13b, an audio collecting unit 14b, a communication unit 18b, and a data storage/read unit 19b. These units are functions that are implemented by or that are caused to function by operating any of the elements illustrated in FIG. 9 in cooperation with the instructions of the CPU 111 according to the image capturing device control program expanded from the SRAM 113 to the DRAM 114.

The image capturing device 1b further includes a memory 1000b, which is implemented by the ROM 112, the SRAM 113, and the DRAM 114 illustrated in FIG. 9. The memory 1000b stores therein a GUID identifying the own device (i.e., the image capturing device 1b).

The acceptance unit 12b, the image capturing unit 13b, the audio collecting unit 14b implement the same or substantially the same functions as those of the acceptance unit 12a, the image capturing unit 13a, and the audio collecting unit 14, respectively.

The communication unit 18b, which is implemented by instructions of the CPU 111, communicates data with a communication unit 98 of the smartphone 9 using the near-distance wireless communication technology in compliance with such as NFC, Bluetooth, or Wi-Fi.

The data storage/read unit 19b, which is implemented by instructions of the CPU 111 illustrated in FIG. 9, stores data or information in the memory 1000b and read out data or information from the memory 1000b.

Functional Configuration of Videoconference Terminal 3

As illustrated in FIG. 13A, the videoconference terminal 3 includes a data exchange unit 31, an acceptance unit 32, an image and audio processor 33, a display control 34, a determination unit 35, a generator 36, a communication unit 38, and a data storage/read unit 39. These units are functions that are implemented by or that are caused to function by operating any of the elements illustrated in FIG. 10 in cooperation with the instructions of the CPU 301 according to the control program for the videoconference terminal 3, expanded from the flash memory 304 to the RAM 303.

The videoconference terminal 3 further includes a memory 3000, which is implemented by the ROM 302, the RAM 303, and the flash memory 304 illustrated in FIG. 10. The memory 3000 stores an image type management DB 3001 and an image capturing device management DB 3002. The image type management DB 3001 is implemented by an image type management table illustrated in FIG. 14. The image capturing device management DB 3002 is implemented by an image capturing device management table illustrated in FIG. 15.

(Image Type Management Table)

FIG. 14 is a conceptual diagram illustrating the image type management table according to an embodiment of this disclosure. The image type management table stores an image data identifier (ID), an IP address of a sender terminal, and a source name, in association with one another. The IP address is an example of a destination of a sender terminal. The image data ID is one example of image data identification information for identifying image data when performing video communication. Identical image data ID is assigned to image data transmitted from the same sender terminal. Accordingly, a destination terminal (that is, a communication terminal that receives image data) can identify a sender terminal from which the image data is received. The IP address of sender terminal is an IP address of a communication terminal that transmits image data identified by the image data ID that is associated with the IP address. The source name is a name for identifying an image capturing device that outputs the image data identified by the image data ID associated with the source name. The source name is one example of image type information. This source name is generated by a communication terminal such as the videoconference terminal 3 according to a predetermined naming rule.

The example of the image type management table illustrated in FIG. 14 indicates that three communication terminals, whose IP addresses are respectively "1.2.1.3", "1.2.2.3", and "1.3.1.3", transmit image data identified by the image data ID "RS001", "RS002", and "RS003", respectively. Further, according to the image type management table illustrated in FIG. 14, the image types represented by the source names of those three communication terminals are "Video_Theta", "Video", and "Video_Theta", which indicate that the image types are the "special image", "general image", and "special image", respectively. In this disclosure, the special image is a full spherical panoramic image.

In another example, data other than the image data may be stored in the image type management table in association with image data ID. Examples of the data other than the image data include audio data and presentation material data shared on a screen.

(Image Capturing Device Management Table)

FIG. 15 is a conceptual diagram illustrating the image capturing device management table according to an embodiment. The image capturing device management table stores a vendor ID and a product ID from among the GUIDs of an image capturing device that is capable of obtaining two hemispherical images, from which a full spherical panoramic image is generated. As the GUID, a vendor ID (VID) and a product ID (PID) used in a USB device are used, for example. Those vendor ID and product ID are stored in a communication terminal such as a videoconference terminal before shipment. In another example, those IDs are added and stored after shipment.

(Each Functional Unit of Videoconference Terminal 3)

Hereinafter, referring to FIG. 10 and FIGS. 13A and 13B, a detailed description is given of each functional unit of the videoconference terminal 3 according to the embodiment.

The data exchange unit 31 of the videoconference terminal 3 is implemented by the network I/F 311 illustrated in FIG. 10, when operating under control of the CPU 301. The data exchange unit 31 exchanges data or information with communication management system 5 via the communication network 100.

The acceptance unit 32 is implemented by the operation key 308, when operating under control of the CPU 301. The acceptance unit 32 receives selections or inputs from a user. An input device such as a touch panel may be used as an alternative to or in place of the operation key 308.

The image and audio processor 33, which is implemented by instructions of the CPU 301 illustrated in FIG. 10, processes image data that is obtained by capturing a subject by the camera 312. In addition, after the audio of the user is converted to an audio signal by the microphone 314, the image and audio processor 33 processes audio data based on this audio signal.

Further, the image and audio processor 33 processes image data received from other communication terminals based on the image type information such as the source name, to enable the display control 34 to control the display 4 to display an image. More specifically, when the image type information indicates a special image, the image and audio processor 33 converts into full spherical image data to generate full spherical panoramic image data as illustrated in FIG. 4B based on the image data such as hemispherical image data as illustrated in FIGS. 3A and 3B, and further generates a predetermined-area image as illustrated in FIG. 6B. Furthermore, the image and audio processor 33 outputs, to the speaker 315, an audio signal according to audio data that is received from another communication terminal via the communication management system 5. The speaker 315 outputs audio based on the audio signal.

The display control 34 is implemented by the display IN 317, when operating under control of the CPU 301. The display control 34 controls the display 4 to display images or characters.

The determination unit 35, which is implemented by instructions of the CPU 301, determines an image type according to the image data received from such as the image capturing device 1a.

The generator 36 is implemented by instructions of the CPU 301. The generator 36 generates the source name, which is one example of the image type information, according to the above-described naming rule, based on a determination result determined by the determination unit 35 indicating a general image or a special image (that is, full spherical panoramic image in this disclosure). For example, when the determination unit 35 determines the image type as a general image, the generator 36 generates the source name "Video" indicating a general image. By contrast, when the determination unit 35 determines the image type as a special image, the generator 36 generates the source name "Video_Theta" indicating a special image.

The communication unit 38 is implemented by the near-distance communication circuit 319 and the antenna 319a, when operating under control of the CPU 301. The communication unit 38 communicates with the communication unit 18a of the image capturing device 1a using the near-distance communication technology in compliance with such as NFC, Bluetooth, or Wi-Fi. Although in the above description the communication unit 38 and the data exchange unit 31 have separate communication units, alternatively a shared communication unit may be used.

The data storage/read unit 39, which is implemented by instructions of the CPU 301 illustrated in FIG. 10, stores data or information in the memory 3000 and reads out data or information from the memory 3000.

Functional Configuration of Communication Management System 5

Hereinafter, referring to FIG. 11 and FIGS. 13A and 13B, a detailed description is given of each functional unit of the communication management system 5. The communication management system 5 includes a data exchange unit 51, a determination unit 55, a generator 56, and a data storage/read unit 59. These units are functions that are implemented by or that are caused to function by operating any of the elements illustrated in FIG. 11 in cooperation with the instructions of the CPU 501 according to the control program for the communication management system 5, expanded from the HD 504 to the RAM 503.

The communication management system 5 further includes a memory 5000, which is implemented by the RAM 503 and the HD 504 illustrated in FIG. 11. The memory 5000 stores a session management DB 5001 and an image type management DB 5002. The session management DB 5001 is implemented by a session management table illustrated in FIG. 16. The image type management DB 5002 is implemented by an image type management table illustrated in FIG. 17.

(Session Management Table)

FIG. 16 is a conceptual diagram illustrating the session management table according to an embodiment. The session management table stores a session ID and an IP address of participating communication terminal, in association with each other. The session ID is one example of session identification information for identifying a session that implements video calling. The session ID is generated for each virtual conference room. The session ID is also stored in each communication terminal such as the videoconference terminal 3. Each communication terminal selects a desired session ID from the session ID or IDs stored therein. The IP address of participating communication terminal indicates an IP address of the communication terminal participating in a virtual conference room identified by the associated session ID.

(Image Type Management Table)

FIG. 17 is a conceptual diagram illustrating the image type management table according to an embodiment. The image type management table illustrated in FIG. 17 stores, in addition to the information items stored in the image type management table illustrated in FIG. 14, the same session ID as the session ID stored in the session management table, in association with one another. The example of the image type management table illustrated in FIG. 17 indicates that three communication terminals whose IP addresses are respectively "1.2.1.3", "1.2.2.3", and "1.3.1.3" are participating in the virtual conference room identified by the session ID "se101". The communication management system 5 stores the same image data ID, IP address of the sender terminal, and image type information as those stored in a communication terminal such as the videoconference terminal 3 in order to transmit such information as the image type information to both a communication terminal that is already in video calling and a newly participating communication terminal that enters the virtual conference room after the video calling has started. Accordingly, the communication terminal that is already in the video calling and the newly participating communication terminal do not have to exchange such information as the image type information with each other.

(Each Functional Unit of Communication Management System 5)

Hereinafter, referring to FIG. 11 and FIGS. 13A and 13B, a detailed description is given of each functional unit of the communication management system 5.

The data exchange unit 51 of the communication management system 5 is implemented by the network I/F 509 illustrated in FIG. 11, when operating under control of the CPU 501. The data exchange unit 51 exchanges data or information with the videoconference terminal 3 or the PC 7 via the communication network 100.

The determination unit 55, which is implemented by instructions of the CPU 501, performs various determinations.

The generator 56, which is implemented by instructions of the CPU 501, generates the image data ID.

The data storage/read unit 59 is implemented by the HDD 505 illustrated in FIG. 11, when operating under control of the CPU 501. The data storage/read unit 59 stores data or information in the memory 5000 and read out data or information from the memory 5000.

Functional Configuration of PC 7

Hereinafter, referring to FIG. 11 and FIGS. 13A and 13B, a detailed description is given of a functional configuration of the PC 7. The PC 7 has the same or substantially the same functions as those of the videoconference terminal 3. In other words, as illustrated in FIG. 13B, the PC 7 includes a data exchange unit 71, an acceptance unit 72, an image and audio processor 73, a display control 74, a determination unit 75, a generator 76, a communication unit 78, and a data storage/read unit 79. These units are functions that are implemented by or that are caused to function by operating any of the hardware elements illustrated in FIG. 11 in cooperation with the instructions of the CPU 501 according to the control program for the PC 7, expanded from the HD 504 to the RAM 503.

The PC 7 further includes a memory 7000, which is implemented by the ROM 502, the RAM 503 and the HD 504 illustrated in FIG. 11. The memory 7000 stores an image type management DB 7001 and an image capturing device management DB 7002. The image type management DB 7001 and the image capturing device management DB 7002 have the same configurations as those of the image type management DB 3001 and the image capturing device management DB 3002, respectively. Therefore, redundant descriptions thereof are omitted below.

(Each Functional Unit of PC 7)

The data exchange unit 71 of the PC 7, which is implemented by the network I/F 509, when operating under control of the CPU 501 illustrated in FIG. 11, implements the similar or substantially the similar function to that of the data exchange unit 31.

The acceptance unit 72, which is implemented by the keyboard 511 and the mouse 512, when operating under control of the CPU 501, implements the similar or substantially the similar function to that of the acceptance unit 32. The image and audio processor 73, which is implemented by instructions of the CPU 501, implements the similar or substantially the similar function to that of the image and audio processor 33. The display control 74, which is implemented by instructions of the CPU 501, implements the similar or substantially the similar function to that of the display control 34. The determination unit 75, which is implemented by instructions of the CPU 501, implements the similar or substantially the similar function to that of the determination unit 35. The generator 76, which is implemented by instructions of the CPU 501, implements the similar or substantially the similar function to that of the generator 36. The communication unit 78, which is implemented by instructions of the CPU 501, implements the similar or substantially the similar function to that of the communication unit 38. The data storage/read unit 79, which is implemented by instructions of the CPU 501, stores data or information in the memory 7000 and read out data or information from the memory 7000.

Functional Configuration of Smartphone 9

Hereinafter, referring to FIG. 12 and FIGS. 13A and 13B, a detailed description is given of a functional configuration of the smartphone 9. The smartphone 9 has the same or substantially the same functions as those of the videoconference terminal 3. In other words, as illustrated in FIG. 13B, the smartphone 9 includes a data exchange unit 91, an acceptance unit 92, an image and audio processor 93, a display control 94, a determination unit 95, a generator 96, a communication unit 98, and a data storage/read unit 99. These units are functions that are implemented by or that are caused to function by operating any of the hardware elements illustrated in FIG. 12 in cooperation with the instructions of the CPU 901 according to the control program for the smartphone 9 opened from the EEPROM 904 to the RAM 903.

The smartphone 9 further includes a memory 9000, which is implemented by the ROM 902, the RAM 903, and the EEPROM 904 illustrated in FIG. 12. The memory 9000 stores an image type management DB 9001 and an image capturing device management DB 9002. The image type management DB 9001 and the image capturing device management DB 9002 have the same configurations as those of the image type management DB 3001 and the image capturing device management DB 3002, respectively. Therefore, redundant descriptions thereof are omitted below.

(Each Functional Unit of Smartphone 9)

The data exchange unit 91 of the smartphone 9, which is implemented by the far-distance communication circuit 911 illustrated in the FIG. 12, when operating under control of the CPU 901, implements the similar or substantially the similar function to that of the data exchange unit 31.

The acceptance unit 92, which is implemented by the touch panel 921, when operating under control of the CPU

901, implements the similar or substantially the similar function to that of the acceptance unit 32.

The image and audio processor 93, which is implemented by instructions of the CPU 901, implements the similar or substantially the similar function to that of the image and audio processor 33.

The display control 94, which is implemented by instructions of the CPU 901, implements the similar or substantially the similar function to that of the display control 34.

The determination unit 95, which is implemented by instructions of the CPU 901, implements the similar or substantially the similar function to that of the determination unit 35.

The generator 96, which is implemented by instructions of the CPU 901, implements the similar or substantially the similar function to that of the generator 36.

The communication unit 98, which is implemented by instructions of the CPU 901, implements the similar or substantially the similar function to that of the communication unit 38.

The data storage/read unit 99, which is implemented by instructions of the CPU 901, stores data or information in the memory 9000 and read out data or information from the memory 9000.

Operation

Participation Process

Figure 18:
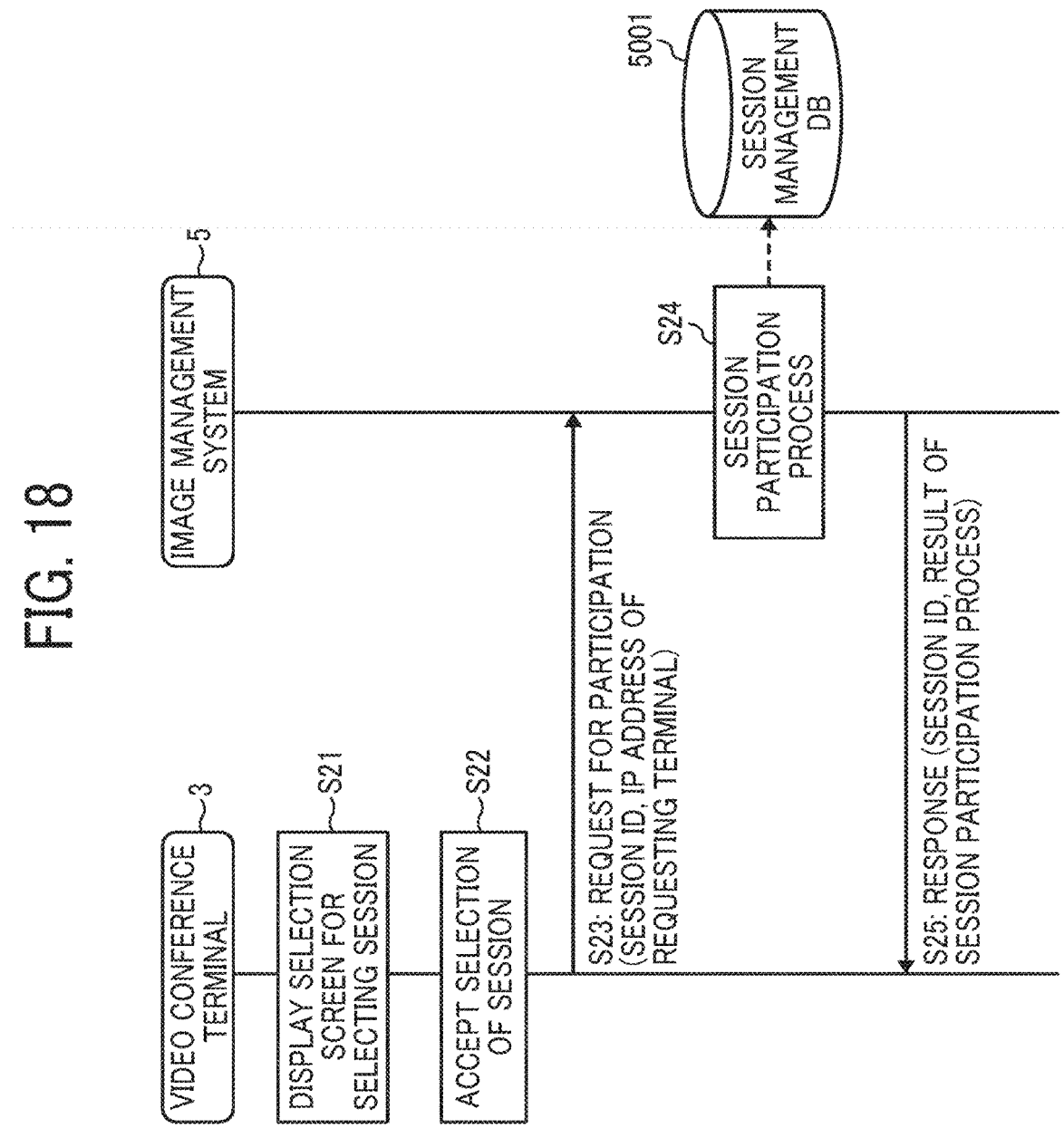
FIG. 18 is a sequence diagram illustrating operation of participating in a specific communication session according to an embodiment of the present disclosure.
Figure 19:
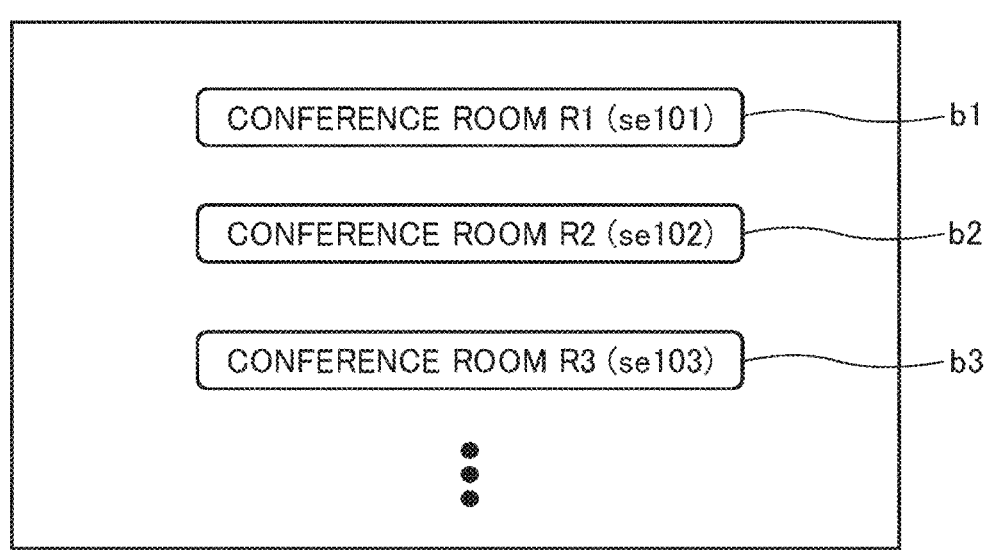
FIG. 19 is a view illustrating a selection screen for accepting selection of a desired communication session (virtual conference), according to an embodiment of the present disclosure.

Referring to FIG. 18 to FIG. 22, a description is given hereinafter of operation according to the embodiment. Firstly, a process of participating in a specific communication session is described with reference to FIG. 18 and FIG. 19. FIG. 18 is a sequence diagram illustrating operation of participating in the specific communication session. FIG. 19 is a view illustrating a selection screen for accepting selection of a desired communication session (virtual conference).

First, the acceptance unit 32 of the videoconference terminal 3 accepts an instruction to display the selection screen for the communication session (virtual conference room), which is input by a user (e.g., the user A1) at the site A. Then, the display control 34 controls the display 4 to display the selection screen as illustrated in FIG. 19 (S21). The selection screen displays selection buttons b1, b2, and b3, which respectively represent virtual conference rooms R1, R2, R3, each being a selection target. Each of the selection buttons b1, b2, and b3 is associated with the session ID.

When the user A1 selects a desired selection button (in this example, the selection button b1) on the selection screen, the acceptance unit 32 accepts selection of a communication session (S22). Then, the data exchange unit 31 transmits a request for participating in a virtual conference room to the communication management system 5 (S23). This participation request includes the session ID identifying the communication session for which the selection is accepted at S22, and the IP address of the videoconference terminal 3 as a request sender terminal. The communication management system 5 receives the participation request at the data exchange unit 51.

Next, the data storage/read unit 99 performs a process for enabling the videoconference terminal 3 to participate in the communication session (S24). More specifically, in the session management DB 5001 (FIG. 16), the data storage/read unit 99 adds the IP address that is received at S23 to an field of the participating terminal IP address in a record of the same session ID as the session ID that is received at S23. The data exchange unit 51 transmits a response to the participation request to the videoconference terminal 3 (S25). This response to the participation request includes the session ID that is received at S23, and a result of the participation process. The videoconference terminal 3 receives the response to the participation request at the data exchange unit 31. The following describes a case in which the process for enabling the videoconference terminal 3 to participate in the communication session is successfully completed.

Management Process of Image Type Information

Figure 20:
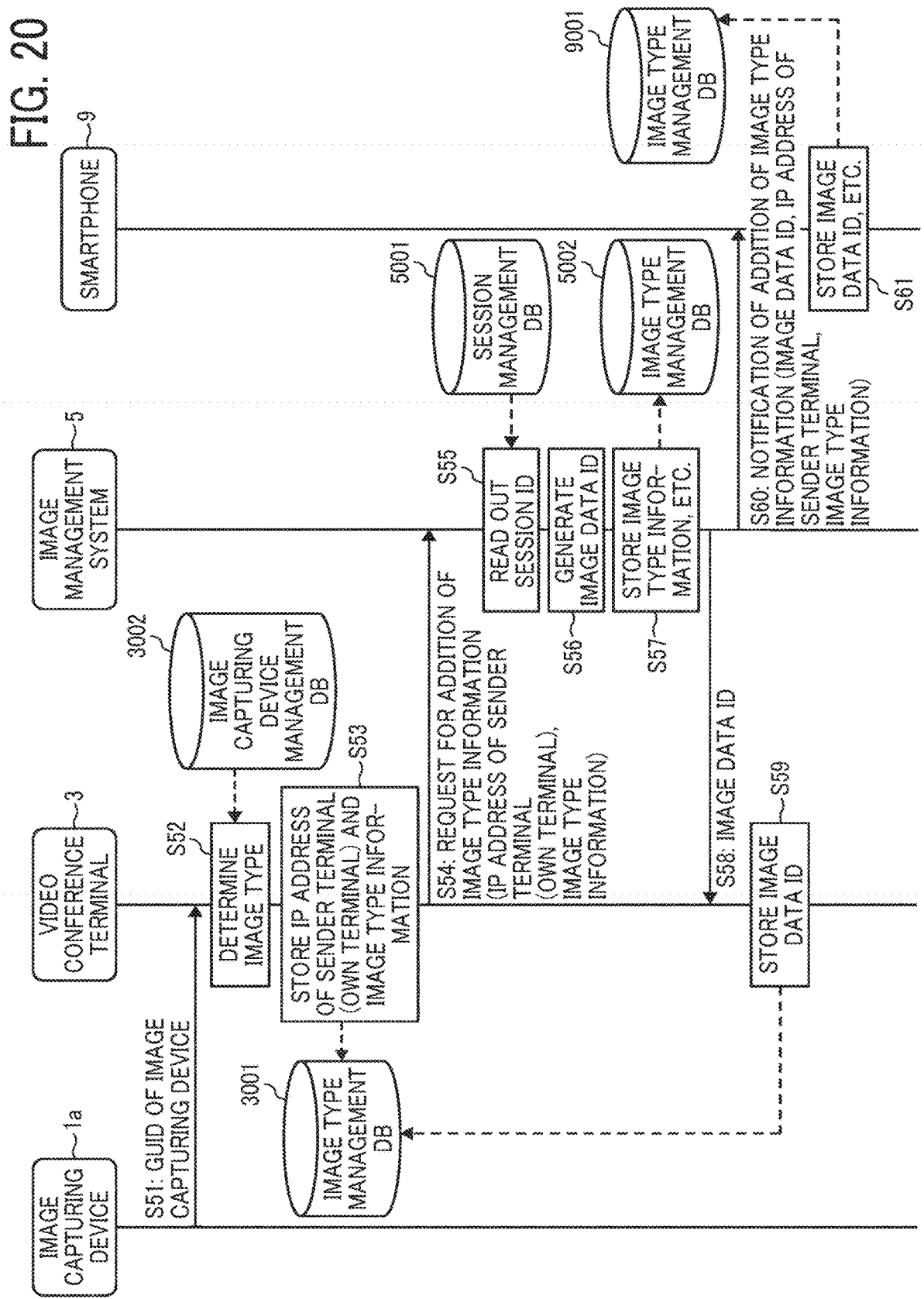
FIG. 20 is a sequence diagram illustrating an operation of managing image type information, according to an embodiment of the present disclosure.

Hereinafter, referring to FIG. 20, a description is given of a management process of the image type information. FIG. 20 is a sequence diagram illustrating an operation of managing the image type information.

First, when a user (e.g., the user A1) at the site A connects the cradle 2a, on which the image capturing device 1a is mounted, to the videoconference terminal 3, using the wired cable such as a USB cable, the storage/read unit 19a of the image capturing device 1a reads out the GUID of the own device (e.g., the image capturing device 1a) from the memory 1000a. Then, the communication unit 18a transmits the own device's GUID to the communication unit 38 of the videoconference terminal 3 (S51). The videoconference terminal 3 receives the GUID of the image capturing device 1a at the communication unit 38.

Next, the determination unit 35 of the videoconference terminal 3 determines whether the same vendor ID and product ID as those of the GUID received at S51 are stored in the image capturing device management DB 3002 (FIG. 15) to determine the image type (S52). More specifically, the determination unit 35 determines that the image capturing device 1a is an image capturing device that captures a special image (a full spherical panoramic image, in this disclosure), in a case in which the same vender ID and product ID are stored in the image capturing device management DB 3002. By contrast, the determination unit 35 determines that the image capturing device 1a is an image capturing device that captures a general image, in a case in which the same vender ID and product ID are not stored in the image capturing device management DB 3002.

Next, the data storage/read unit 39 stores, in the image type management DB 3001 (FIG. 14), the IP address of the own terminal (i.e., videoconference terminal 3) as the sender terminal, and the image type information as a determination result determined at S52, in association with each other (S53). In this state, the image data ID is not yet associated. Examples of the image type information include the source name that is determined according to a predetermined naming rule, and the image type (general image or special image type).

Then, the data exchange unit 31 transmits a request for adding the image type information to the communication management system 5 (S54). This request for adding image type information includes the IP address of the own terminal as a sender terminal, and the image type information, both being stored at S53 in association with each other. The data exchange unit 51 of the communication management system 5 receives the request for adding the image type information.

Next, the data storage/read unit 59 of the communication management system 5 searches the session management DB 5001 (FIG. 16) using the IP address of the sender terminal received at S54 as a search key, to read out the session ID associated with the IP address (S55).

Next, the generator 56 generates a unique image data ID (S56). Then, the data storage/read unit 59 stores, in the image type management DB 5002 (FIG. 17), a new record associating the session ID that is read out at S55, the image data ID generated at S56, the IP address of the sender terminal and the image type information that are received at S54, with one another (S57). The data exchange unit 51 transmits the image data ID generated at S56 to the videoconference terminal 3. The videoconference terminal 3 receives the image data ID at the data exchange unit 31 (S58).

Next, the data storage/read unit 39 of the videoconference terminal 3 stores, in the image type management DB 3001 (FIG. 14), the image data ID received at S58, in association with the IP address of the own terminal (i.e., videoconference terminal 3) as the sender terminal and the image type information that are stored at S53 (S59).

Further, the data exchange unit 51 of the communication management system 5 transmits a notification of addition of the image type information to the smartphone 9 as other communication terminal (S60). This notification of addition of the image type information includes the image data ID generated at S56, and the IP address of the own terminal (i.e., videoconference terminal 3) as the sender terminal and the image type information that are stored at S53. The smartphone 9 receives the notification of addition of the image type information at the data exchange unit 91. The destination to which the data exchange unit 51 transmits the notification is other IP address that is associated with the same session ID as that associated with the IP address of the videoconference terminal 3 in the session management DB 5001 (FIG. 16). In other words, the destination is other communication terminal that is in the same virtual conference room as the videoconference terminal 3.

Next, the data storage/read unit 99 of the smartphone 9 stores, in the image type management DB 9001 (FIG. 14), a new record associating the image data ID, the IP address of the sender terminal, and the image type information, which are received at S60 (S61). In substantially the same manner, the notification of addition of the image type information is transmitted to the PC 7 as other communication terminal. The PC 7 also stores, in the image type management DB 7001 (FIG. 14), the image data ID, the IP address of the sender terminal, and the image type information. Through the operation as described heretofore, the same information is shared among the communication terminals in the image type management DBs 3001, 7001 and 9001, respectively.

Image Data Transmission Process

Hereinafter, referring to FIGS. 21 to 23, a description is given of an image data transmission process in video calling.

FIG. 21 is a sequence diagram illustrating an image data transmission process in video calling.

First, the communication unit 18a of the image capturing device 1a transmits image data obtained by capturing an image of a subject or surroundings to the communication unit 38 of the videoconference terminal 3 (S101). In this case, because the image capturing device 1a is a device that is capable of obtaining two hemispherical images from which a full spherical panoramic image is generated, the image data is configured by data of the two hemispherical images as illustrated in FIGS. 3A and 3B. The videoconference terminal 3 receives the image data at the communication unit 38.

Next, the data exchange unit 31 of the videoconference terminal 3 transmits, to the communication management system 5, the image data received from the image capturing device 1a (S102). This transmission includes an image data ID for identifying the image data as a transmission target. Thus, the communication management system 5 receives the image data and the image data ID at the data exchange unit 51.

Next, the data exchange unit 51 of the communication management system 5 transmits, to the smartphone 9, the image data received from the videoconference terminal 3 (S103). This transmission includes the image data ID for identifying the image data as a transmission target. Thus, the smartphone 9 receives the image data and the image data ID at the data exchange unit 51.

Next, the data storage/read unit 99 of the smartphone 9 searches the image type management DB 9001 (FIG. 14) using the image data ID received at S103 as a search key, to read out the image type information (source name) associated with the image data ID (S104). When the image type information indicates a special image (full spherical panoramic image, in this disclosure), i.e., when the image type information is "Video_Theta", the image and audio processor 93 generates a full spherical panoramic image from the image data received at S103, and further generates a predetermined-area image (S105). In this case, the image and audio processor 93 synthesizes the predetermined-area image with an icon 191 (described later) indicating a full spherical panoramic image, based on the image type information (Video_Theta) indicating a special image.

The display control 94 controls the display 917 of the smartphone 9 to display the predetermined-area image including the icon 191.

When the image type information indicates a general image, i.e., when the image type information is "Video", the image and audio processor 93 does not generate a full spherical panoramic image from the image data received at S103 In this case, the display control 94 displays a general image that does not contain the icon 191.

Figure 22A:
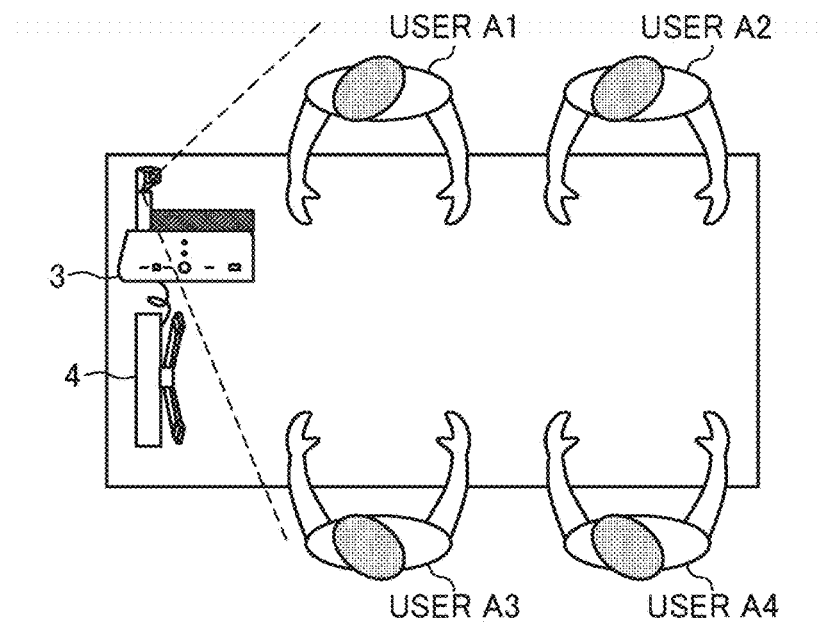
FIG. 22A illustrates an example state of video calling in a case which the image capturing device of FIGS. 1A to 1C is not used, according to an embodiment of the present disclosure.
Figure 22B:
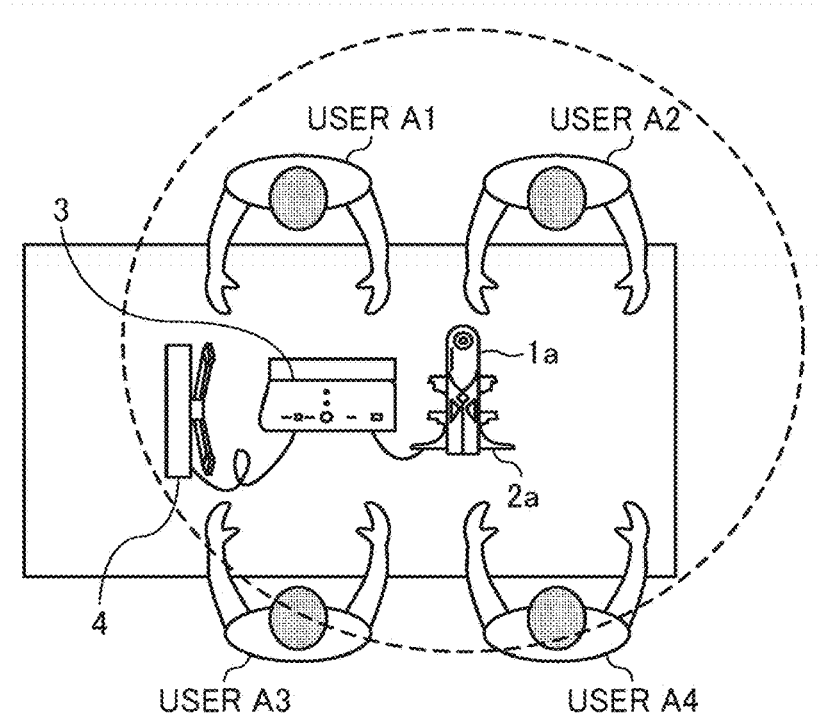
FIG. 22B illustrates an example state of video calling in a case which the image capturing device of FIGS. 1A to 1C is used, according to an embodiment of the present disclosure.

Next, referring to FIGS. 22A and 22B, a description is given of a state of video calling. FIGS. 22A and 22B illustrate example states of video calling. More specifically, FIG. 22A illustrates a case in which the image capturing device 1a is not used, while FIG. 22B illustrates a case in which the image capturing device 1a is used.

First, as illustrated in FIG. 22A, when the camera 312 (FIG. 10) that is built into the videoconference terminal 3 is used, that is, without using the image capturing device 1a, the videoconference terminal 3 has to be placed at the corner of a desk, so that the users A1 to A4 can be captured with the camera 312, because the angle of view is horizontally 125 degrees and vertically 70 degrees. This requires the users A1 to A4 to talk while looking in the direction of the videoconference terminal 3. Further, because the user A1 to A4 look in the direction of the videoconference terminal 3, the display 4 has also to be placed near the videoconference terminal 3. This requires the user A2 and the user A4, who are away from the videoconference terminal 3 (FIG. 10), to talk in a relatively loud voice, because they are away from the microphone 314. Further, it may be difficult for the user A2 and A4 to see contents displayed on the display 4.

By contrast, as illustrated in FIG. 22B, when the image capturing device 1a is used, the videoconference terminal 3 and the display 4 can be placed relatively at the center of the desk, because the image capturing device 1a is capable of obtaining two hemispherical images from which a full spherical panoramic image is generated. This enables the users A1 to A4 to talk in a relatively small voice, because they are close to the microphone 314. Further, it gets easier for the users A1 to A4 to see contents displayed on the display 4.

Figure 23A:
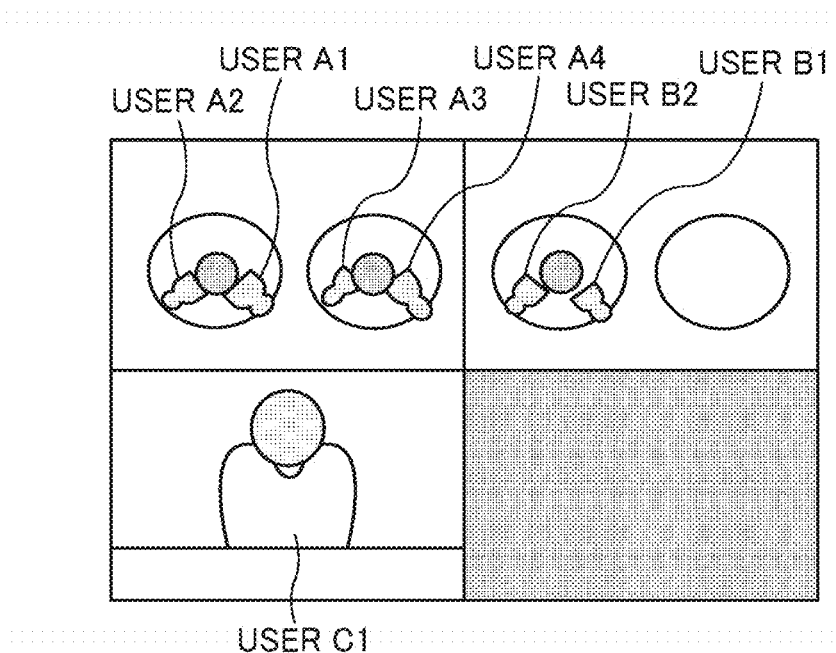
FIG. 23A is a view illustrating an example of a content displayed in a case in which image data transmitted from the image capturing device of FIGS. 1A to 1C is displayed as is, that is, without generating a full spherical panoramic image and a predetermined-area image, according to an embodiment of the present disclosure.
Figure 23B:
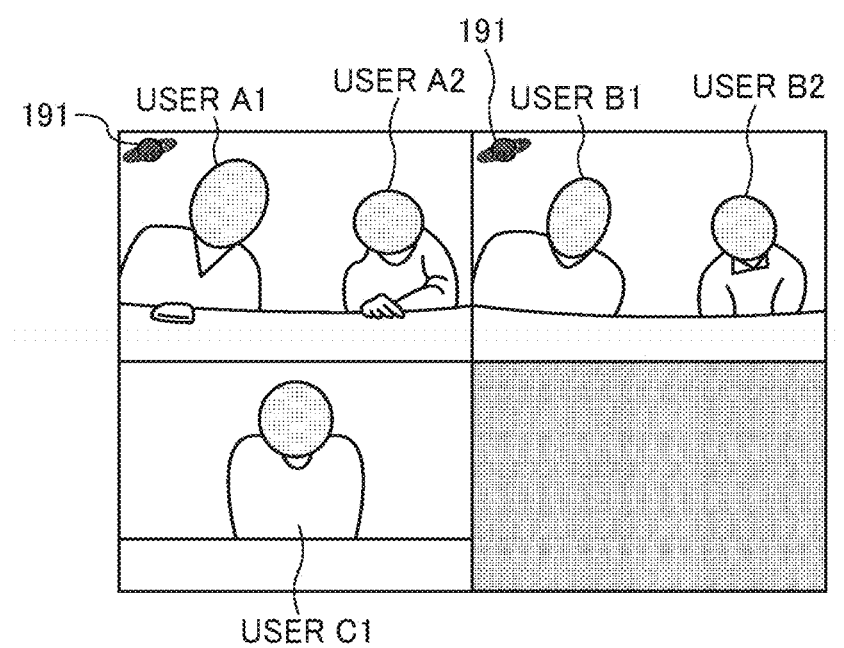
FIG. 23B is a view illustrating an example of a content displayed in a case in which a full spherical panoramic image and a predetermined-area image are generated based on image data transmitted from the image capturing device of FIGS. 1A to 1C, according to an embodiment of the present disclosure.

Hereinafter, referring to FIGS. 23A and 23B, a description is given of a display example on the display 917 at the site B. FIGS. 23A and 23B are views, each illustrating a display example on the display 917 at the site B. FIG. 23A is a view illustrating an example in which image data transmitted from respective ones of the videoconference terminal 3 (image capturing device 1a) and the image capturing device 1b are displayed as they are, that is, without generating a full spherical panoramic image and a predetermined-area image. Further, in the example of FIG. 23A, image data transmitted from the PC 7 (image capturing device 8) is also displayed as it is. FIG. 23B is a view illustrating an example in which predetermined-area images are displayed, which are generated based on full spherical panoramic images generated from the image data transmitted from the videoconference terminal 3 (image capturing device 1a) and the image capturing device 1b, respectively. Further, in the example of FIG. 23B, image data transmitted from the PC 7 (image capturing device 8) is displayed as it is. In this example, an image of the site A is displayed in an upper-left display area of the display 917. In an upper-right display area, an image of the site B (own site) is displayed. In a lower-left display area, an image of the site C is displayed. Because in this example, simultaneous video calling is performed among the three sites, no image is displayed in a lower-right display area.

When the image data transmitted from respective ones of the image capturing device 1a and the image capturing device 1b, each being capable capturing a full spherical panoramic image, are displayed as they are, images are displayed as illustrated in FIG. 23A. In other words, the site A in the upper left area and the site B in the upper right area are each displayed as the front-side hemispherical image as illustrated in FIG. 3A and the back-side hemispherical image as illustrated in FIG. 3B.

By contrast, when the image and audio processor 93 generates a full spherical panoramic image from the image data transmitted from respective ones of the image capturing device 1a and the image capturing device 1b, each being capable of obtaining two hemispherical images from which a full spherical panoramic image is generated, and further generates a predetermined-area image, a predetermined-area image, which is a flat image, is displayed as illustrated in FIG. 23B.

The general image is displayed in both of FIGS. 23A and 23B because at the site C, the image capturing device 8 that obtains a general image is provided.

Further, at the upper left corner of the images of the site A and the site B, the icon 191 indicating a full spherical panoramic image is displayed. In another example, the icon 191 may be displayed at any location other than the upper left corner, such as an upper right, lower left, or lower right corner of the image. The icon 191 illustrated in FIG. 23B is just one example, and an icon having any suitable shape, size, or color, may be used. Further, in alternative to or in addition to the icon 191, a character string such as "Full spherical image", or a combination of an icon and characters may be used.

Furthermore, a user is able to change a predetermined area for the predetermined-area image in the same full spherical panoramic image. More specifically, when the user B1 or the user B2 moves his/her finger on the touch panel 921 of the smartphone 9, the acceptance unit 92 detects the movement of the finger. The display control 94 shifts, rotates, reduces, or enlarges the predetermined-area image based on the movement of the finger detected by the acceptance unit 92. This enables to shift the predetermined-area image so that the user A3 and the user A4 are displayed, even in a case in which the predetermined-area image displayed according to an initial setting (by default) contains only a part of the users at the site A, that is, the user A1 and the user A2 as illustrated in FIG. 23B.

As described heretofore, according to the present embodiment, the communication terminal such as the videoconference terminal 3 generates a full spherical panoramic image, and further generates a predetermined-area image, depending on the image type information associated with the image data ID that is transmitted along with image data. This prevents the front side hemispherical image and the back side hemispherical image from being displayed as illustrated in FIG. 23A.

Variation

Figure 24:
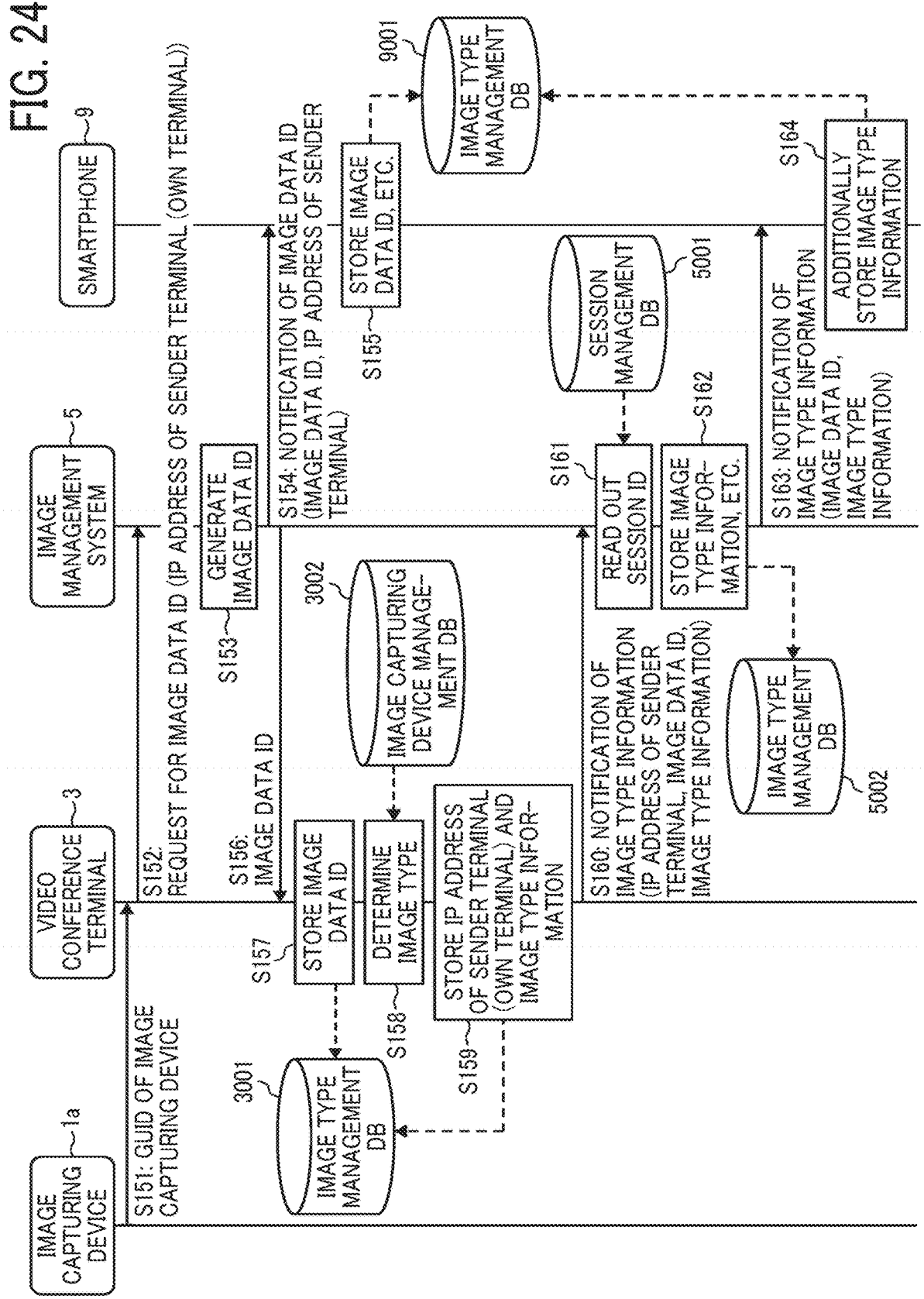
FIG. 24 is a sequence diagram illustrating another example of an operation of managing the image type information, according to an embodiment of the present disclosure.

Hereinafter, referring to FIG. 24, a description is given of another example of a management process of the image type information. FIG. 24 is a sequence diagram illustrating another example of an operation of managing the image type information.

First, when a user (e.g., the user A1) at the site A connects the cradle 2a, on which the image capturing device 1a is mounted, to the videoconference terminal 3, using the wired cable such as a USB cable, the storage/read unit 19a of the image capturing device 1a reads out the GUID of the own device (e.g., the image capturing device 1a) from the memory 1000a. Then, the communication unit 18a transmits the own device's GUID to the communication unit 38 of the videoconference terminal 3 (S151). The videoconference terminal 3 receives the GUID of the image capturing device 1a the communication unit 38.

Next, the data exchange unit 31 of the videoconference terminal 3 transmits a request for the image data ID to the communication management system 5 (S152). This request includes the IP address of the videoconference terminal 3, which is the sender terminal (own terminal). The communication management system 5 receives the request for the image data ID at the data exchange unit 51.

Next, the generator 56 generates a unique image data ID (S153). Then, the communication management system 5 transmits a notification of the image data ID to the smartphone 9 (S154). This notification includes the image data ID generated at S153, and the IP address of videoconference terminal 3 as the sender terminal, which is received at S152. Thus, the smartphone 9 receives the notification of the image data ID at the data exchange unit 91. Next, the data storage/read unit 99 of the smartphone 9 stores, in the image type management DB 9001 (FIG. 14), a new record associating the image data ID and the IP address of the sender terminal with each other, which are received at S154 (S155). At this time, the image type information is not stored in association with other information.

Further, in order to respond to the request for the image data ID at S152, the data exchange unit 51 of the communication management system 5 transmits the image data ID to the videoconference terminal 3 (S156). The videoconference terminal 3 receives the image data ID at the data exchange unit 31. Next, the data storage/read unit 39 of the videoconference terminal 3 stores, in the image type management DB 3001 (FIG. 14), a new record associating the image data ID received at S156 with the IP address of the sender terminal (own terminal) stored in the videoconference terminal 3 (S157). At this time, the image type information is not stored in association with other information.

Next, the determination unit 35 of the videoconference terminal 3 determines whether the same vendor ID and product ID as those of the GUID received at S151 are stored in the image capturing device management DB 3002 (FIG. 15) to determine the image type (S158). This determination is performed in the same or substantially the same manner as the above-described S52.

Next, the data storage/read unit 39 stores, in the image type management DB 3001 (FIG. 14), the IP address of the own terminal (i.e., videoconference terminal 3) as the sender terminal, and the image type information as a determination result determined at S158, in association with the image data ID stored at S157 (S159). Then, the data exchange unit 31 transmits a notification of the image type information to the communication management system 5 (S160). This notification of the image type information includes the image data ID stored at S157, and the IP address of the own terminal as the sender terminal and the image type information that are stored at S159. The communication management system 5 receives the notification of the image type information at the data exchange unit 51.

Next, the data storage/read unit 59 of the communication management system 5 searches the session management DB 5001 (FIG. 16) using the IP address of the sender terminal received at S160 as a search key, to read out the session ID associated with the IP address (S161).

Then, the data storage/read unit 59 stores, in the image type management DB 5002 (FIG. 17), a new record associating the session ID that is read out at S161, the IP address of the sender terminal, the image data ID and the image type information that are received at S160, with one another (S162). Further, the communication management system 5 transmits a notification of the image type information to the smartphone 9 as other communication terminal (S163). This notification of the image type information includes the image data ID and the image type information that are stored at S162. The smartphone 9 receives the notification of the image type information at the data exchange unit 91.

Next, the data storage/read unit 99 of the smartphone 9 additionally stores, in the image type management DB 9001 (FIG. 14), the image type information received at S163 in association with the same image data ID as the image data ID received at S163 (S164). With the processes from S151 to S164, an operation of managing the image type information ends.

According to an embodiment of the present disclosure, a second communication terminal that received image data is able to perform image processing depending on image type information. Accordingly, an image that is suitable for viewing is generated.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication management system comprising:
circuitry configured to:
receive image data, a first IP address of a first communication terminal, and image type information from a first communication terminal,
obtain session identification stored in a memory by searching the memory using the first IP address of the first communication terminal as a search key,
generate image data identification information identifying the image data based on the image type information,
store, in the memory, the generated image data identification information, the image type information, and the image data in association with the obtained session identification, and
transmit the image data identification information and the image data to a second communication terminal having a second IP address, the second IP address being associated with the obtained session identification.

2. A system that exchanges image data between a first communication terminal connected to an image capturing device and a second communication terminal via a communication management system, the system comprising:
the first communication terminal having first circuitry configured to:
identify an image type of image data captured by the image capturing device;
generate image type information based on a result of the identified image type; and
transmit the image data captured by the image capturing device, a first IP address of the first communication terminal, and the generated image type information to the communication management system,
the communication management system having second circuitry configured to:
receive the image data, the first IP address of the first communication terminal, and the image type information transmitted from the first communication terminal;
obtain a session identification stored in a memory by searching the memory using the received first IP address of the first communication terminal as a search key;
generate image data identification information identifying the image data based on the image type information;
store, in the memory, the generated image data identification information, the image type information, and the image data in association with the obtained session identification;
transmit the image data identification information and the image data to the second communication terminal having a second IP address, the second IP address being associated with the obtained session identification in the memory;
the second communication terminal having third circuitry configured to:
receive the image data identification information and the image data from the communication management system;
when the image type information corresponding to the image data identification information received from the first communication terminal via the communication management system indicates a spherical image type, generate, from the image data, a predetermined-area image representing a partial area of a spherical image based on image type information corresponding to the received image data identification information; and display the generated predetermined-area image representing the partial area of the spherical image, wherein the image type information is information relating to an image capturing device that captures the image data.

3. The system of claim 2, wherein, when the image type information corresponding to the received image data identification information indicates a flat image type, the third circuitry of second communication terminal is further configured to generate a predetermined-area image representing a partial area of a flat image.

4. A method for a communication management apparatus, the method comprising:

receiving, by the communication management apparatus, image data, a first IP address of a first communication terminal, and image type information from the first communication terminal;

obtaining a session identification stored in a memory by searching the memory using the received first IP address of the first communication terminal as a search key;

generating image data identification information identifying the image data based on the image type information, storing, in the memory, the generated image data identification information, the image type information, and the image data in association with the obtained session identification; and transmit the image data identification information and the image data to a second communication terminal having a second IP address, the second IP address being associated with the obtained session identification in the memory.

5. A method for a system that exchanges image data between a first communication terminal connected to an image capturing device and a second communication terminal via a communication management system, the method comprising:

identifying an image type of image data captured by the image capturing device;

generating image type information based on a result of the identified image type;

transmitting the image data captured by the image capturing device, a first IP address of the first communication terminal, and the generated image type information to the communication management system, receiving the image data, the first IP address of the first communication terminal, and the image type information transmitted from the first communication terminal;

obtaining a session identification stored in a memory by searching the memory using the received first IP address of the first communication terminal as a search key;

generating image data identification information for identifying the image data based on the image type information;

storing in the memory the generated image data identification information, the image type information, and the image data in association with the obtained session identification;

transmitting the image data identification information and the image data to the second communication terminal having a second IP address, the second IP address being associated with the obtained session identification in the memory;

receiving the image data identification information and the image data from the communication management system;

when the image type information corresponding to the image data identification information received from the first communication terminal via the communication management system indicates a spherical image type, generating, from the image data, a predetermined-area image representing a partial area of a spherical image based on image type information corresponding to the received image data identification information; and displaying the generated predetermined-area image representing the partial area of the spherical image, wherein the image type information is information relating to an image capturing device that captures the image data.

6. The method of claim 5, wherein, when the image type information corresponding to the received image data identification information indicates a flat image type, further comprising:

generating a predetermined-area image representing a partial area of a flat image.

* * * * *